US012164756B2

(12) United States Patent
Li et al.

(10) Patent No.: US 12,164,756 B2
(45) Date of Patent: Dec. 10, 2024

(54) TIMELINE USER INTERFACE

(71) Applicant: Huawei Technologies Co., Ltd., Guangdong (CN)

(72) Inventors: Wei Li, Markham (CA); Sachi Mizobuchi, Toronto (CA); Qiang Xu, Richmond Hill (CA); Wei Zhou, Richmond Hill (CA); Jianpeng Xu, Markham (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/231,920

(22) Filed: Apr. 15, 2021

(65) Prior Publication Data

US 2021/0294485 A1 Sep. 23, 2021

Related U.S. Application Data

(63) Continuation of application No. PCT/CN2018/111054, filed on Oct. 19, 2018.

(51) Int. Cl.
*G06F 3/048* (2013.01)
*G06F 3/04842* (2022.01)
(Continued)

(52) U.S. Cl.
CPC ........ *G06F 3/04842* (2013.01); *G06F 3/0485* (2013.01); *G06Q 10/1097* (2013.01); *G06F 3/04845* (2013.01)

(58) Field of Classification Search
CPC ............... G06F 3/04842; G06F 3/0485; G06F 3/04845; G06Q 10/1096
See application file for complete search history.

(56) References Cited

U.S. PATENT DOCUMENTS 9,002,328 B2 * 4/2015 Aaron ................ G06Q 10/1093 705/14.42
9,823,818 B1 * 11/2017 Ryan ................... G06F 3/04842
(Continued)

FOREIGN PATENT DOCUMENTS

CN 102572356 A 7/2012
CN 102647467 A 8/2012
(Continued)

OTHER PUBLICATIONS

International Search Report and Written Opinion of PCT/CN2018/111054 dated Jul. 18, 2019.

*Primary Examiner* — Mahelet Shiberou

(57) ABSTRACT

Generating a user timeline for an electronic device (ED) userData is collected that includes: location data; application data; and activity data. Occurrences of predetermined types of observed events are detected based on the collected data. For each detected occurrence a respective observed event record is stored that includes information about a time and type of the observed event. Planned event records, each including information about a time and type of a respective planned event, are stored for planned events that the user is scheduled to participate in, the planned event records. Events are predicted based on the observed event records and the planned event records. Information about observed, planned and predicted events are output on a timeline user interface based on observed event records, planned event records and predicted event records stored for the predicted events, respectively.

20 Claims, 20 Drawing Sheets

(51) Int. Cl.
*G06F 3/0485* (2022.01)
*G06Q 10/1093* (2023.01)
*G06F 3/04845* (2022.01)

(56) References Cited

U.S. PATENT DOCUMENTS

| | | | | |
|---|---|---|---|---|
| 10,739,985 | B2 * | 8/2020 | Matsubara | G06F 3/0485 |
| 10,929,818 | B2 * | 2/2021 | Zhang | G06N 5/01 |
| 11,017,474 | B1 * | 5/2021 | Guerrero | G06F 3/04817 |
| 11,429,883 | B2 * | 8/2022 | Dotan-Cohen | H04W 4/02 |
| 2013/0036080 | A1 | 2/2013 | Kane-Esrig | |
| 2013/0232411 | A1 | 9/2013 | Chen | |
| 2013/0325787 | A1 | 12/2013 | Gerken et al. | |
| 2014/0099075 | A1 | 4/2014 | Li et al. | |
| 2014/0129559 | A1 * | 5/2014 | Estes | G06Q 10/10 707/737 |
| 2014/0278071 | A1 | 9/2014 | San Filippo et al. | |
| 2014/0278086 | A1 | 9/2014 | San Filippo et al. | |
| 2015/0294223 | A1 | 10/2015 | Brown | |
| 2017/0017929 | A1 * | 1/2017 | Masiero | G06F 16/24568 |
| 2017/0140285 | A1 | 5/2017 | Dotan-Cohen et al. | |
| 2017/0178013 | A1 * | 6/2017 | Beloglazov | G01C 21/3461 |
| 2017/0228700 | A1 * | 8/2017 | Kim | G06Q 10/1095 |
| 2018/0285829 | A1 * | 10/2018 | Hostyn | G06F 9/542 |
| 2019/0362563 | A1 * | 11/2019 | Mukherjee | G06F 3/011 |

FOREIGN PATENT DOCUMENTS

| | | | |
|---|---|---|---|
| CN | 102831487 | A | 12/2012 |
| CN | 103220396 | A | 7/2013 |
| CN | 103856896 | A | 6/2014 |
| CN | 105677547 | A | 6/2016 |
| CN | 105843477 | A | 8/2016 |
| CN | 107646119 | A | 1/2018 |
| CN | 108351884 | A | 7/2018 |
| KR | 20160058366 | A | 5/2016 |
| WO | 2018089574 | A1 | 5/2018 |

* cited by examiner

Location Data 326

| | Day | hour | milliseconds | latitude | longitude | altitude | gpsStart | accuracy | bearing | speed |
|---|---|---|---|---|---|---|---|---|---|---|
| 1 | 20180222 | 5 | 1519338957729 | 43.851325242 | -79.363170777 | 176.93094856 | 1519338948258 | 4.0 | 0.0 | 1.1422870159... |
| 2 | 20180222 | 6 | 1519342722999 | 43.825142473 | -79.306081569 | 169.386214879 | 1519342709600 | 4.0 | 0.0 | 1.4134329557... |
| 3 | 20180222 | 6 | 1519342795000 | 43.825110483 | -79.306096354 | 146.14155082 | 1519342770289 | 8.0 | 0.0 | 0.0 |
| 4 | 20180222 | 6 | 1519342967000 | 43.823961308 | -79.306659376 | 180.225941735 | 1519342956294 | 6.0 | 0.0 | 0.0 |
| 5 | 20180222 | 6 | 1519343049999 | 43.821484196 | -79.316591191 | 190.404251099 | 1519343032359 | 8.0000038146... | 252.49931335... | 20.827053070... |
| . | . | . | . | . | . | . | . | . | . | . |
| . | . | . | . | . | . | . | . | . | . | . |
| 12 | 20180222 | 6 | 1519343679156 | 43.846306505 | -79.368536729 | 160.94972229 | 1519343667674 | 4.0000009536... | 0.0 | 4.9106111526... |
| 13 | 20180222 | 6 | 1519343869000 | 43.85135185 | -79.363290821 | 155.563598633 | 1519343849516 | 4.0000009536... | 0.0 | 0.4554829895... |
| 14 | 20180222 | 6 | 1519343922325 | 43.851562392 | -79.36304247 | 165.710828669 | 1519343912937 | 12.0 | 0.0 | 2.7853639125... |
| 15 | 20180222 | 7 | 1519344187999 | 43.851450348 | -79.362217194 | 160.839172363 | 1519344186869 | 4.0000009536... | 74.981101989... | 2.3956530094... |
| 16 | 20180222 | 7 | 1519344367999 | 43.865326881 | -79.362015777 | 169.97354126 | 1519344367304 | 4.0000009536... | 349.82644653... | 17.512857437... |
| 17 | 20180222 | 7 | 1519344498999 | 43.876416984 | -79.364755912 | 165.806625366 | 1519344498076 | 4.0000009536... | 349.66665649... | 18.952762603... |
| 18 | 20180222 | 7 | 1519344815999 | 43.88047869 | -79.391810389 | 182.210876465 | 1519344815501 | 3.0000009536... | 249.61874389... | 15.334692001... |
| 19 | 20180222 | 7 | 1519344898999 | 43.883515172 | -79.397977851 | 187.207565308 | 1519344897998 | 3.0000009536... | 342.18096923... | 12.324035644... |
| 20 | 20180222 | 7 | 1519344999999 | 43.884972934 | -79.397480558 | 185.795199525 | 1519344984908 | 4.0 | 0.0 | 0.0 |
| 21 | 20180222 | 7 | 1519345019999 | 43.88492204 | -79.397501906 | 184.862675229 | 1519345015044 | 4.0 | 0.0 | 0.0 |
| 22 | 20180222 | 7 | 1519345045999 | 43.884921868... | -79.39750159... | 184.84998190... | 1519345045320 | 4.0 | 0.0 | 0.0 |

FIG. 4

| Planned Events | |
|---|---|
| **Category** | **Planned Event Type 604** |
| Scheduled Through Other App (e.g. Calendar Modules/Task Module) | Appointment |
| | Meeting |
| | Task |
| | Reminder |
| Scheduled By User Through Timeline Module | Appointment |
| | Meeting |
| | Task |
| | Reminder |

FIG. 6

| Detected Events 700 | |
|---|---|
| **Category 702** | **Event Type 704** |
| Location | Work |
| | School |
| | Home |
| | Park |
| | Airport |
| | Hotel |
| | (Other locations....) |
| User Activity | Walking |
| | Running |
| | Car |
| | Subway |
| | Plane |
| | Sleeping |
| | (Other Activities....) |
| App Usage | Take Picture with ED Camera |
| | Stream Audio (App A) |
| | Stream Video (App B) |
| | Pay Bill (App C) |
| | Order Car (App D) |
| | Online Shopping (App E) |
| | Receive/Send Message (App F) |
| | Flight Check-in (App G) |
| | Send/Receive Email |
| | Schedule Event/Reminder with Calendar App |
| | Schedule Task with Task App |
| | (Other App Usage...) |

FIG. 7

| Observed Events – Physical Location 802 | | | | | | | | | |
|---|---|---|---|---|---|---|---|---|---|
| Event ID | Time of Record | Start Time | End Time | Event Duration | Start Location<br>Lat:<br>Long:<br>Altitude:<br>Nearest Address:<br>Nearest Location Name: | End Location<br>Lat:<br>Long:<br>Altitude:<br>Nearest Address:<br>Nearest Location Name: | Event Type | State | Other Attributes |
| 1 | | | | | | | | | |
| 2 | | | | | | | | | |
| ..... | | | | | | | | | |
| Y | | | | | | | | | |

316

| Observed Events – App Usage 804 | | | | | | | | |
|---|---|---|---|---|---|---|---|---|
| Event ID | Time of Record | Start Time | End Time | Event Duration | App Category | App Name | Event Type | Other Attributes |
| 1 | | | | | | | | |
| 2 | | | | | | | | |
| ..... | | | | | | | | |
| Y | | | | | | | | |

| **Predicted Event Types 900** |
|---|
| Depart Reminder |
| Order Transportation |
| Order Food |
| Order Gift |
| Check-In |
| Next Transit Reminder |
| Travel |
| Work |
| Social |
| Sport |
| Bill Payment |
| Meeting |
| Appointment |
| Birthday |
| Contact Person |
| Birthday |
| Anniversary |
| Delivery |

FIG. 9

Timeline User Database 314

Observed Event Records 316

Observed Event Record 316(1)
Event ID: 1101; Type: Work; Start Time: 8:52AM; End Time: 10:03am;
Location: 19 Allstate Pkw, Markham ON, Canada

Planned Event Records 318

Planned Event Record 318(0)
Event ID: 1105; Type: Meeting; Start Time: 9:30AM; End Time: 10:00am;
Location: 19 Allstate Pkw, Markham ON, Canada; Room: B; Attendees: You, Bob, Mary, Jane Planned Event Record 318(1)
Event ID: 1107; Type: Meeting; Start Time: 1:00PM; End Time: 1:30pm; Location: Hangout Video chat;
Attendees: You, Mary, Charles; Confidence: 1

Planned Event Record 318(2)
Event ID: 1109; Type: Travel, Fight; Departure 2:00pm YYZ; Arrival 3:30PM PEK; Confidence: 1

Predicted Event Records 320

Predicted Event Record 320(1)
Event ID: 1113; Type: Pre-Travel, Fight; Start Time: 11:00am; End time 2:00pm; Location YYZ; Confidence: 1

Predicted Event Record 320(2)
Event ID: 1115; Type: Order Uber to YYZ; Order Time: 10:10 am; Status: Not ordered; Confidence: 0

Predicted Event Record 320(3)
Event ID: 1117; Type: Check-in; Time: 11:00am; Estimated wait time: 25m; Confidence: 1

Predicted Event Record 320(4)
Event ID: 1119; Type: Security; Time: 11:40am, Estimated wait time: 20m; Confidence: 1

Predicted Event Record 320(5)
Event ID: 1121; Type: Meal; Start Time: 12:10pm; End Time: 12:50pm; Confidence: 0

Predicted Event Record 320(6)
Event ID: 1123; Type: Board Plane; Time: 1:30pm; Gate: 36; Confidence: 1

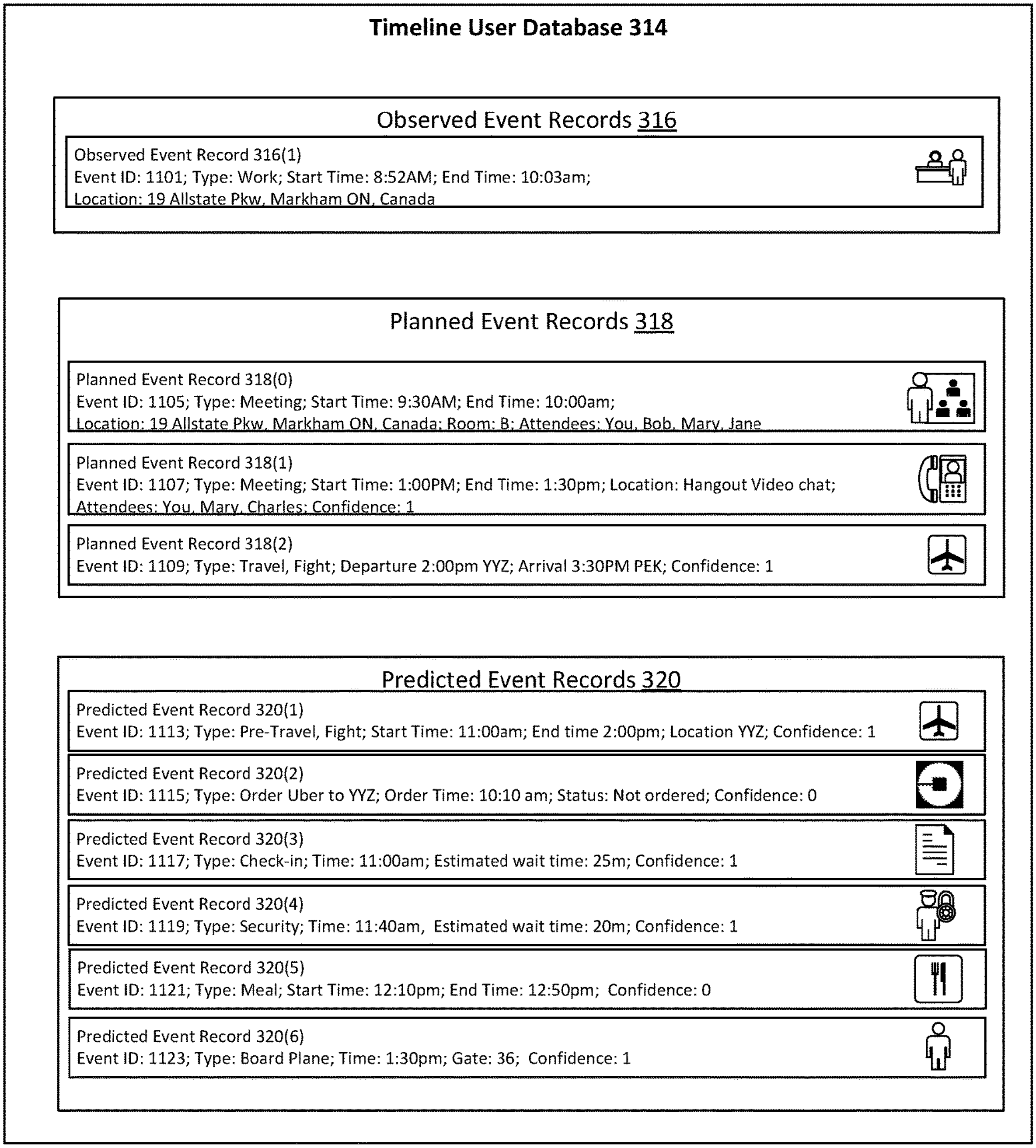

FIG. 11

TIMELINE USER INTERFACE

RELATED APPLICATIONS

The present application is a continuation of, and claims priority to, International Application No. PCT/CN2018/111,054, filed Oct. 19, 2018, entitled TIMELINE USER INTERFACE, the contents of which are incorporated herein by reference.

TECHNICAL FIELD

The present disclosure relates generally to electronic devices, and more specifically a methods and systems for generating and presenting user specific timeline based data.

BACKGROUND

The functionality of personal electronic devices such as smart phones and wearable devices is ever increasing. These devices are enabled to provide, among other things phone functionality, emailing and messaging functionality, video conferencing functionality, map navigation functionality, gaming functionality, image and video creation functionality, media viewing functionality, scheduling functionality, location and activity tracking functionality. These devices also have an ever increasing number of sensors that continuously track data about the environment of the phone. Currently, in order to take advantage of the functionality of and data available from their electronic devices, users must spend large periods of times interfacing with their devices. For example, scheduling an event may require a user to open and switch between multiple applications and display screens to gather all information required to schedule the event, leading to inefficient use of device resources and wireless networks that support the device.

Accordingly, systems and methods that allow information to be gathered and presented and events to be scheduled in a more efficient manner are desired.

SUMMARY

Example methods and systems for generating and presenting user specific timeline based data are described that may provide a user with efficient to access to meaningful information that is pertinent to the user. In at least some examples, information may be deduced and presented by an electronic device to enable reduced consumption of resources by the electronic device.

According to a first example aspect, a method for generating a user timeline for a user associated with an electronic device (ED) is provided. The method includes: collecting, during operation of the ED, data that includes: location data for the ED; application use data received from a plurality of applications used by the ED; and activity data from one or both of input devices and sensing devices of the ED; detecting occurrences of predetermined types of observed events based on the collected data, and for each detected occurrence storing a respective observed event record that includes information about a time and type of the observed event; storing planned event records for planned events that the user is scheduled to participate in, the planned event records each including information about a time and type of a respective planned event; predicting events based on the observed event records and the planned event records, and for each predicted event, generating and storing a respective predicted event record including information about a time and type of the of the predicted event; and outputting information about observed, planned and predicted events on a timeline user interface based on the observed event records, planned event records and predicted event records, respectively.

In some examples embodiments of the method, predicting events is also based on previously stored predicted event records.

In some examples embodiments, outputting information about observed, planned and predicted events comprises generating a timeline graphical user interface (GUI) on a display of the ED that includes graphical event indicators that each represent a respective observed, planned or predicted event record. In some examples the timeline GUI comprises a scrollable display object that displays graphical event indicators representing observed, planned and/or predicted event records that have time information corresponding to a displayed timeline duration. In some examples, the scrollable display object is semi-transparent and is displayed over further information displayed on the display.

According to some example embodiments of the first aspect, the method includes assigning a confidence attribute to predicted events, wherein the graphical event indicators represent the confidence value assigned to the predicted event represented thereby.

According to some example embodiments of the first aspect, the method includes, in response to detecting a predefined user input selecting one of the graphical event indicators, causing a predefined action to be taken by the ED. In some examples, determining the predefined action is based on one or more of: (a) the event type information of the event record represented by the selected graphical event indicator; (b) a location of the ED at the time of detecting the predefined user input; (c) a time of selection relative to a time of the future event. In some examples, at least some of the observed event records identify a shortcut to content accessible through one or more of the applications used by the ED, wherein the predefined action the selected graphical event indicator represents one of the observed event records that identifies a shortcut is to enable the shortcut. In some examples, the content is video content and the shortcut enables the video content to resume viewing the video content at a specified location at which video viewing was previously suspended.

According to some example embodiments of the first aspect, predicting events includes predicting a travel suggestion event upon determining that a location gap exists between a location of the ED and a location of a future event.

According to some example embodiments of the first aspect, the method includes displaying, as part of the timeline GUI, map and route information between events that have respective event records represented by graphical indicators on the timeline GUI.

According to some example embodiments of the first aspect, the planned event records correspond to events that are scheduled on calendar or task application modules, events that are input through the timeline GUI, and events that are based on information extracted from messages received by the ED through a network.

According to some example embodiments of the first aspect, predicting events comprises assigning possibility values to a plurality of candidate events based on stored event records, and selecting the candidate event with the highest possibility value as a predicted event.

According to a second aspect, an electronic device (ED) is disclosed that includes a processor and a memory coupled to the processor storing executable instructions. The processor is configured by the executable instructions to generate a user timeline for a user associated with the ED by: collecting, during operation of the ED, data that includes: location data for the ED; application use data received from a plurality of applications used by the ED; and activity data from one or both of input devices and sensing devices of the ED; detecting occurrences of predetermined types of observed events based on the collected data, and for each detected occurrence storing a respective observed event record that includes information about a time and type of the observed event; storing planned event records for planned events that the user is scheduled to participate in, the planned event records each including information about a time and type of a respective planned event; predicting events based on the observed event records and the planned event records, and for each predicted event, generating and storing a respective predicted event record including information about a time and type of the of the predicted event; and outputting information about observed, planned and predicted events on a timeline user interface based on the observed event records, planned event records and predicted event records, respectively.

In example embodiments, the memory includes non-transient storage that stores a timeline user database that includes the observed event records, planned event records, and predicted event records.

According to a third example aspect there is provided a computer readable medium tangibly storing instructions that when executed by a processor cause the processor to generate a user timeline for a user associated with an electronic device (ED) by: collecting, during operation of the ED, data that includes location data for the ED, application use data received from a plurality of applications used by the ED, and activity data from one or both of input devices and sensing devices of the ED; detecting occurrences of predetermined types of observed events based on the collected data, and for each detected occurrence storing a respective observed event record that includes information about a time and type of the observed event; storing planned event records for planned events that the user is scheduled to participate in, the planned event records each including information about a time and type of a respective planned event; predicting events based on the observed event records and the planned event records, and for each predicted event, generating and storing a respective predicted event record including information about a time and type of the of the predicted event; and outputting information about observed, planned and predicted events on a timeline user interface based on the observed event records, planned event records and predicted event records, respectively.

BRIEF DESCRIPTION OF THE DRAWINGS

FIG. 4 is table illustrating an example of a location data included in a timeline data log associated with the timeline module of FIG. 3.

FIG. 6 is a table illustrating examples of types of planned events detected by a processing engine of the timeline module of FIG. 3.

FIG. 7 is a table illustrating examples of types of events observed by the processing engine of the timeline module of FIG. 3.

FIG. 8 shows tables illustrating examples of record formats for physical location events and application usage events that have been detected by the processing engine.

FIG. 9 is a table illustrating examples of types of events processed by a prediction engine of the timeline module of FIG. 3.

FIG. 11 is a table representing event records used to generate the GUI of FIG. 10.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

Figure 1:
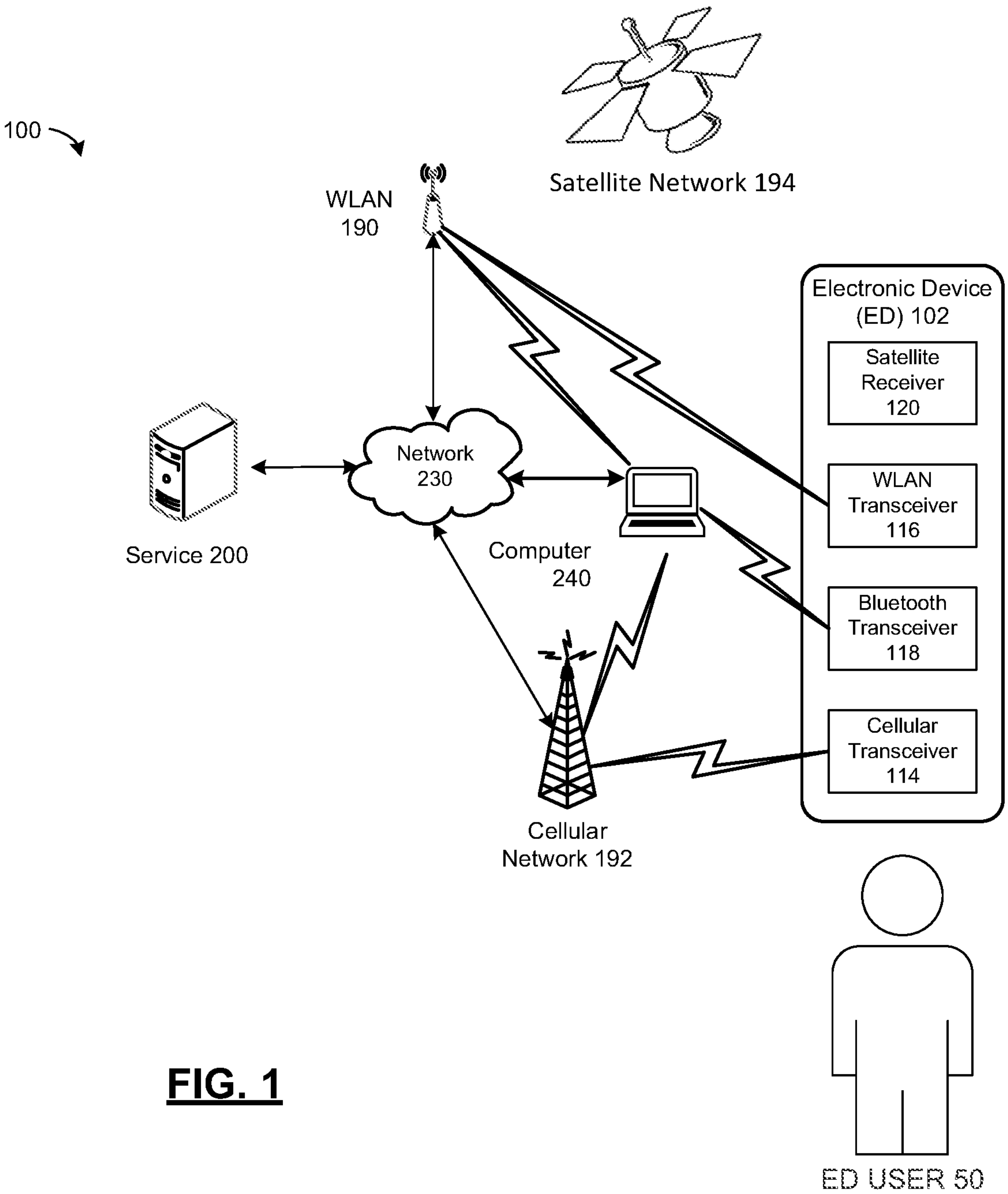
FIG. 1 is a block diagram illustrating a communication system suitable for use with an electronic device (ED) in accordance with an example embodiment.
Figure 2:
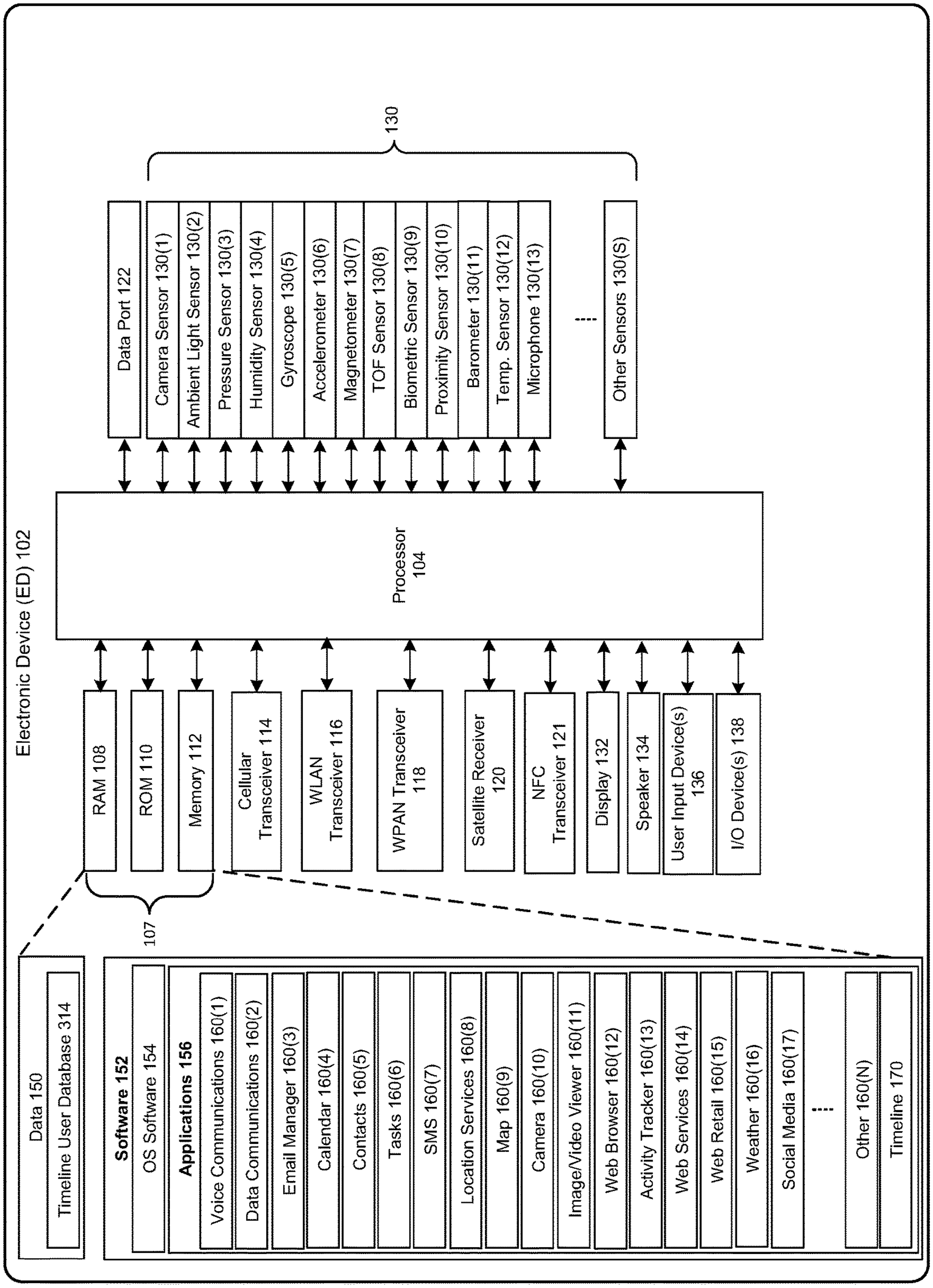
FIG. 2 is a block diagram illustrating an ED in accordance with an example embodiment.

Referring to FIGS. 1 and 2, an example embodiment of an electronic device (ED) 102 of the present disclosure will be described. FIG. 1 is a block diagram illustrating a communication system 100 suitable for operating an ED 102 in accordance with the present disclosure. As described in greater detail below, communication system 100 can include multiple different types of communication networks in communication with the ED 102 and each of these communication networks can each be connected directly or indirectly to a further common network 230 such as the Internet, enabling the ED 102 to access one or more services 200 through the network 230.

In example embodiments ED 102 is associated with at least one subscriber or primary user 50 who owns, has been assigned, or is otherwise associated with ED 102.

In the presently described embodiment, as shown in FIG. 2, ED 102 is a multipurpose mobile electronic device and includes at least one processor 104 which controls the overall operation of the ED 102. In some examples, ED 102 may be implemented as handheld mobile electronic device such as a smart phone or tablet. In some examples, the functionality of ED 102 described in this disclosure may be carried out across platforms, for example across a smartphone and a smartwatch that communicate with each other in a wireless personal area network. The processor 104 is coupled to a plurality of components via a communication bus (not shown) which provides a communication path between the components and the processor 104. The components of ED 102 comprise digital storage 107 that can include Random Access Memory (RAM) 108, Read Only Memory (ROM) 110, and persistent (non-volatile) memory 112 which may be flash erasable programmable read only memory (EPROM) ("flash memory") or other suitable form of memory. The ED 102 may also include a data port 122 such as a serial data port (e.g., Universal Serial Bus (USB) data port).

In example embodiments, the components of ED 102 include a plurality of environmental sensors 130 coupled to the processor 104 for sensing the environment of the ED 102. The sensors 130 may include one or more of each of the following sensors: camera sensor 130(1); ambient light sensor 130(2); pressure sensor 130(3); humidity sensor 130(4); orientation and movement sensors such as gyroscope 130(5), accelerometer 130(6), and magnetometer 130(7); Time-of-Flight (TOF) sensor 130(8); biometric sensor 130(9) (e.g., fingerprint reader); proximity sensor 130(10); barometer 130(11); temperature sensor 130(12); audio sensor such as microphone 130(13) and other sensors 130(S).

In example embodiments, the processor 104 is also coupled to one or more output devices (such as a display 132, a speaker 134), one or more user input devices 136 and one or more further I/O devices 138. Display 132 may for example include a color liquid crystal display (LCD) or active-matrix organic light-emitting diode (AMOLED) display. User input device(s) 136 may include a keyboard or keypad, one or more buttons, one or more switches, a touchpad, a rocker switch, or other type of input device. In addition to or instead of a keyboard or keypad, the display 132 may be provided as part of a touchscreen or touch-sensitive display which provides a user input device 136. The display 132 which together with a touch-sensitive overlay operably coupled to an electronic controller (not shown) or with touch sensors integrated into the display 132 operably coupled to an electronic controller (not shown) may comprise the touch-sensitive display. Other I/O devices 138 may include, for example: one or more LED notification lights, a vibration device, and an auxiliary I/O port for connection to external microphonic and audio output devices.

During operation of the ED, user-interaction with a graphical user interface (GUI) presented on the display 132 can performed using the user input devices 136 and one or more of the sensors 130. Information, such as text, characters, symbols, images, icons, and other items are rendered and displayed on the display 132 via the processor 104. The processor 104 may also interact with one or more sensors 130, such as the gyroscope 130(5), accelerometer 130(6) and magnetometer 130(7) to detect direction of gravitational forces or gravity-induced reaction forces so as to determine, for example, the orientation of the ED 102 in order to determine a screen orientation for the GUI and to determine orientation and acceleration based user inputs to the ED 102. In example embodiments, the microphone 130(13) may be used in conjunction with a speech to text engine to provide voice input of commands to the processor 104.

The ED 102 also comprises a satellite receiver 120 for receiving satellite signals from a satellite network 194 that comprises a plurality of satellites that are part of a global or regional satellite navigation system. In some embodiments, a satellite transceiver capable of both receiving and sending satellite signals may be provided instead of a satellite receiver that can only receive satellite signals.

The ED 102 can use signals received by the satellite receiver 120 from a plurality of satellites in the satellite network 194 to determine its position. In at least some embodiments, the satellite network 194 comprises a plurality of satellites that are part of at least one Global Navigation Satellite System (GNSS) that provides autonomous geo-spatial positioning with global coverage. For example, the satellite network 194 may be a constellation of GNSS satellites. Example GNSSs include the United States NAVSTAR Global Positioning System (GPS) or China's BeiDou Navigation Satellite System (BDS), among others.

The ED 102 also comprises one or more wireless transceivers for exchanging at least data communications. The wireless transceivers comprises at least a cellular (RF) transceiver 114 for communicating with a plurality of different radio access networks (RAN) such as a cellular network 192. The wireless transceivers may also comprise a wireless local area network (WLAN) transceiver 116 for communicating with a WLAN 190 via a WLAN access point (AP). The WLAN 190 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a wireless personal area network (WPAN) transceiver 118, such as a short range wireless or Bluetooth® transceiver, for communicating with a computer 240 or other Bluetooth® enabled devices such a activity tracker or smartphone. The ED 102 may alternatively communicate with the computer 240 or other user devices using a physical link such as the data port 122 (e.g., USB port). The wireless transceivers can also include Near field communication (NFC) transceiver 121.

Referring again to FIG. 2, software 152 is stored on the digital storage 107 of ED 102 that includes sets of instructions for execution by the processor 104. Software 152, which may for example be stored in persistent memory 112, can include operating system (OS) software 154 and software applications 156.

Data 150, which includes user data, database files, and saved logs, among other data, is also stored in digital storage 107. In example embodiments, portions of data 150 that are created by the execution of software 152 by processor 104 and that is transient may be stored in volatile memory such as RAM 108, and portions of data 150 that is persistent may be stored in persistent memory such as memory 112 or ROM 110. In some examples, data from RAM 108 may be transferred to persistent memory 112 for persistent storage. Software 152 and data 150, or parts thereof, stored in persistent memory 112 may be temporarily loaded into a volatile store, such as RAM 108, which is used for storing runtime data variables and other types of data or information.

In example embodiments, the processor 104 may be configured by OS software 154 to use off-device storage for some applications 156 and data 150. For example, portions of applications 156 and data 150 that are not immediately required by the processor 104 may be deleted from the ED's 102 digital storage 107 and transferred and stored at a remote service 200 that is associated with the ED 102, and then retrieved by the ED 102 and transferred to digital storage 107 on an as-needed basis.

The processor 104 enables execution of OS software 152 and software applications 156 on the ED 102. OS software 152 and a basic set of applications 156 may be installed on the ED 102 during manufacture and updated during device initialization. Additional applications 156 may be downloaded and installed on the ED 102 through network 230 from various software providing services 200. The applications 156 include groups of instructions that configure the processor 104 to implement various functional modules 160(1) to 160(N) (referred to generically herein as modules 160 or module 160). In some examples, the instructions for a superset of modules 160 may be included in a single application 156, and in some applications the instructions for a single module 160 could be included across multiple applications 156, and in some examples a single module 160 could correspond to a single application 156. In some examples, some of the modules 160 identified within applications 156 may be incorporated into OS software 154. Some modules 160 may include sub-modules such as widgets for implementing low resource consuming functions such as a calculator widget, etc. In various embodiments, some of the modules 160 shown in FIG. 2 may be implemented as sub-modules incorporated into larger modules, and some of the modules 160 in FIG. 2 may be split out into multiple modules. In some applications, some modules 160 may be widgets or client application program interfaces (APIs) that are low resource modules configured to operate in the background and periodically retrieve information through network 230 from one or more remote services 200 (e.g. weather, traffic and news APIs).

As illustrated in FIG. 2, examples of some of the modules 160 implemented by the processor 104 based on instructions included in the UE software 152 can include modules that control basic device operations such as voice communications module 160(1) and data communications module 160 (2). Other basic modules 160 can include personal information management (PIM) modules that are configured for the ED user 50 such as: email manager module 160(3), calendar module 160(4), contacts module 160(5), tasks module 160 (6), and network service provider text/SMS module 160(7). In example embodiments, PIM modules 160(3)-160(6) may be capable of organizing and managing PIM data items that are specific to the ED user 50, such as email, calendar events, contacts, voice mails, appointments, and task items. The PIM modules 160(3)-160(6) may also be capable of sending and receiving the PIM data items via one or more of the transceivers 116, 118, 121 of the ED 102. The PIM data items may be seamlessly integrated, synchronized and updated via the wireless networks of communication system 100 with corresponding PIM data items for the ED user 50 stored or associated with a host service 200.

Modules 160 can also include a location service module 160(8) that continually tracks the geographical location of the ED 102 based on location information received or derived from one or a combination of satellite receiver 120, cellular transceiver 114, WLAN transceiver 116, WPAN transceiver 118, and NFC transceiver 121. Location service module 160(8) may also derive geographical location information from environmental sensors 130, including for example movement and orientation information from gyroscope 130(5), accelerometer 130(6) and magnetometer 130 (7), and atmospheric pressure and humidity information from barometer 130(11) and humidity sensor 130(4), respectively.

Map module 160(9), which may for example be implemented on ED 102 using a mapping application (for example Apple® Maps or Google® Maps), allows location information from the location service module 160(8) to be correlated to labelled map locations and corresponding map data to be output by the ED 102.

Modules 160 can also include camera module 160(10), image/video manager/viewer module 160(11), web browser module 160(12), activity tracker module 160(13), web services module(s) 160(14), web retail module(s) 160(15), weather module 160(16), social media modules 160(17), as well as other modules 160(N).

Web services module(s) 160(14) may for example be implemented by respective applications 156 that enable access to web-enabled services such as on-demand ride services such as Uber® and Lyft®, car sharing services such as Zipcar® and Maven®, food delivery services, travel reservation and booking services such as Expedia®, Trip Adviser® and AirBnBR.

Web retail module(s) 160(15) may for example be implemented by respective applications 156 that enable access to web-enabled retail purchasing services such as Amazon® and Alibaba®.

Social media modules 160(17) may for example be implemented by respective applications such as Facebook®, Facebook Messenger®, WhatsApp®, Instagram®, Twitter®, etc.

In example embodiments, the software 152 stored in digital storage 107 on ED 102 includes instructions that configure the processor 104 to implement a timeline module 170. As will now be described in detail, timeline module 170 interacts with software application modules 160 and sensors 130 to collect and process sensor data and application data to generate timeline event data for the ED user 50 and that can be output by the UE 102 through an interactive user interface. In at least some applications, timeline module 170 may enable efficient use of the resources of one or both of ED 102 and its supporting wireless networks, among other things, reducing the number of user interactions with ED 102 required to present critical information and support user requested tasks.

Figure 3:
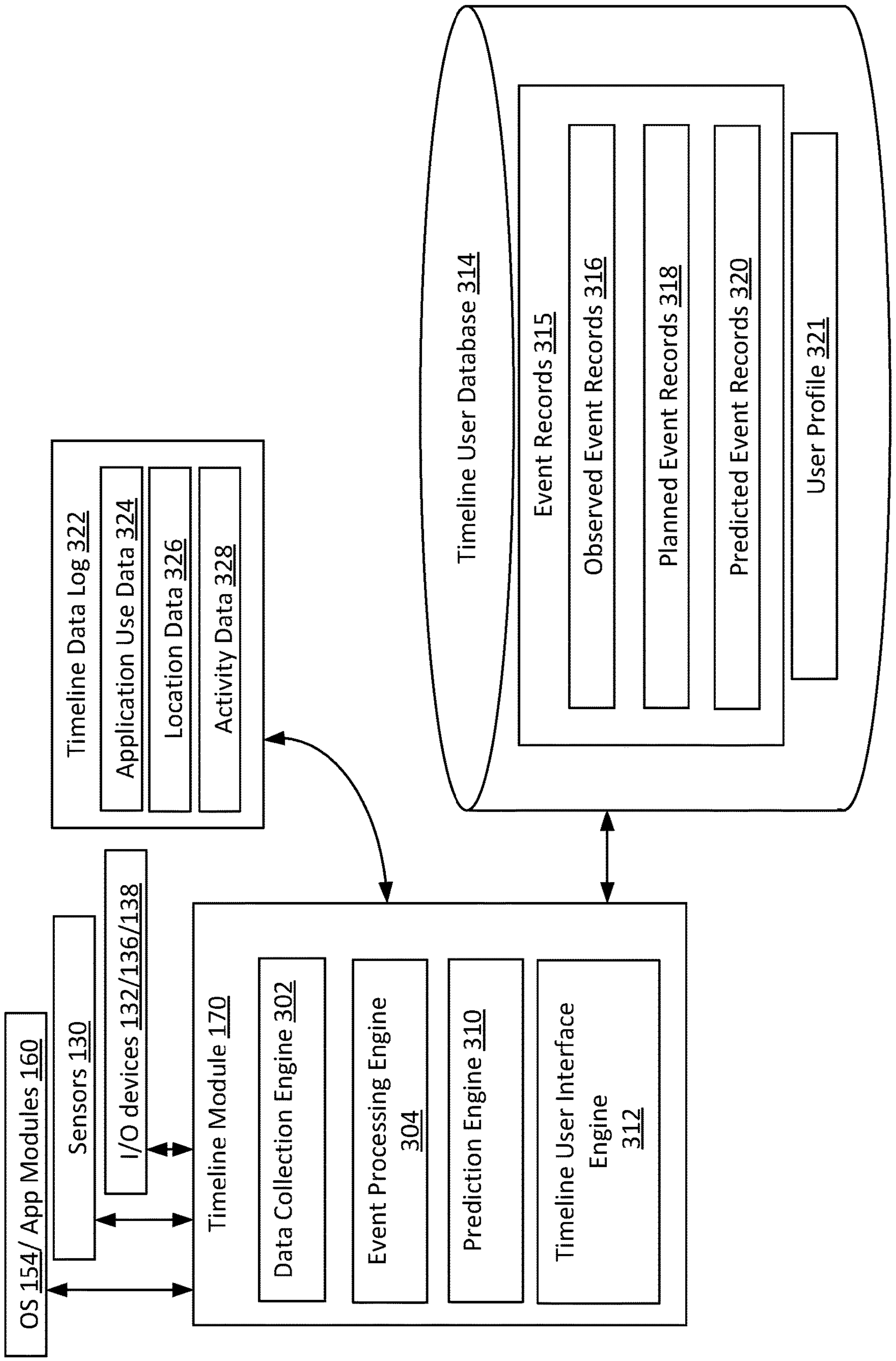
FIG. 3 is a block diagram illustrating functional blocks of a timeline module implemented by the ED of FIG. 2 in accordance with an example embodiment.

FIG. 3 is a block diagram illustrating functional blocks of the timeline module 170 and data elements that are associated with the timeline module 170, according to an example embodiment. As indicated in FIG. 3, in example embodiments the timeline module 170 includes a plurality of functional blocks that can include: a data collection engine 302; an event processing engine 304; an event prediction engine 310; and a timeline user interface (UI) engine 312. Although described as comprising multiple logical engines, some or all of the functions of some or all of the engines 302, 304, 310 and 312 may in some examples be combined into a smaller number of logical processing engines or divided apart into a greater number of processing engines. As indicated in FIG. 3, the data elements that are associated with the timeline module 170 include a timeline data log 322 and timeline user database 314, which can be stored as part of data 150 in digital storage 107 in example embodiments.

Timeline module 170 is configured to generate and maintain the data of timeline user database 314. Timeline user database 314 functions as a user specific database that includes the information necessary for ED 102 to generate and present timeline events to a user 50 of the ED 102. In this regard, in example embodiments timeline user database 314 includes event records 315 and user profile information 321. As will be explained in greater detail below, event records 315 can be categorized into: observed event records 316 for events that are observed by ED 102 as they occur; planned event records 318 for events that are scheduled to occur; and predicted event records 320 for unplanned events that are predicted to occur in the future.

The user profile record 321 contains attributes for a specific individual ED user 50 who is associated with timeline module 170. For example, the specific individual user 50 may be the primary user of ED 102, and the user profile record 321 may include data fields that specify at least some of the following information about the primary ED user 50: first name, last name, age, date of birth, gender, marital status, number of children, height, weight, home address, and work address. In some examples, the user profile record 321 is augmented with additional data over time as the timeline module 170 learns more about the user. For example, location information and labels for other frequently visited locations in addition to work and home can be added such as location information for a child's school, labelled "(Child's name)'s school". In some examples, event processing engine 304 applies temporal reasoning based on past event data and future event data to update and add data to the user profile record 321.

In example embodiments, some or all of the data of timeline user database 314 is stored in persistent memory 112 of ED 102 and portions of the data or pointers to the data are loaded to RAM 108 as required. In at least some examples, timeline user database 314 is a logical database that may be distributed across or mirrored at a plurality of devices and computers such as ED 102, computer 240 and one or more services 200, that can be synchronized using one or more of networks 190, 192, 194, and 230. In at least some examples, the timeline user database 314 is a relational database. In some examples, a user can receive information from timeline user database 314 at multiple platforms that support respective instances of timeline module 170 that are associated with the user 50, and similarly, timeline module 170 can receive information about the user 50 from the multiple platforms.

An overview of the operation of timeline module 170 of FIG. 3 will now be explained in greater detail, starting with data collection engine 302. During the ongoing operation of ED 102, data collection engine 302 collects data from sensors 130 and software 152 and processes that data to provide logs or datasets that are in a format suitable for use by other components of timeline module 170 such as event processing engine 304 and prediction engine 310. In example embodiments, at least some of this collected data is processed and stored in a timeline data log 322 that is maintained in transient memory such as RAM 108. The timeline data log 322 may include time-stamped application use data 324 and time-stamped location data 326 that is collected from application modules 160 and sensors 130. The timeline data log 322 may also include time-stamped activity data 328 that includes activity logs or datasets. The activity logs or dataset includes a plurality of successive time-stamped data entries in which each entry include information about physical user interaction with ED 102 through user input devices 136, as well as and other kino-dynamic state parameters of the ED 102 measured through sensors 130 such as device pose (pitch, yaw, roll), temperature, and vibration, among other things. In some examples, the timeline data log 322 could include distinct logs or datasets for data collected from individual sensors 130 and from individual modules 160. In at least some examples, logs or datasets may be maintained that are an amalgamation of data from multiple sensors and/or modules 160.

In example embodiments, the data collected by the data collection for the datasets of timeline data log 322 could be obtained through periodic polling of selected sensors 130 and modules 160, and such polling could be done at different frequencies for different datasets. In some examples, selected sensors 130 and modules 160 could be configured to push data to timeline module 170 only when a predetermined event or status change occurs. In example embodiments, the data stored in timeline data log 322 is treated as transient data that and is discarded on a rolling basis after a predetermined duration passes or a predetermined trigger event occurs (for example when the stored data in a dataset hits a threshold volume of data). In example embodiments, selected modules 160 are associated with the timeline module 170 through pre-authorization or pre-registration by ED user 50, thereby permitting the selected associated modules 160 to provide data to timeline module 170.

As noted above, the timeline data log 322 includes time-stamped location data 326. In example embodiments, the time-stamped location data 326 is received from data collection engine 302 which collects time-stamped location data from location services module 160(8) and processes the location data to provide location logs or datasets of location data (referred to as location logs or datasets). As noted above, location services module 160(8) is configured to generate location data for ED 102 based one or more of: GNSS (e.g. GPS) signals received through satellite receiver 120; location information derived from one or a combination of transceivers 114, 116, 118, and 121; and location information derived from sensors 130 and data collection engine 302 collects the location data and processes the location data into location logs or datasets. FIG. 4 shows an example of time-stamped location data 326 that includes a location log or dataset of location data of location data (e.g., GNSS data) collected by data collection engine 302 from location services module 160(8). As shown in FIG. 4, the location log or dataset includes a plurality of successive time-stamped data entries that each specify the following location information for the ED 102: day, time, latitude, longitude, altitude, bearing and speed.

An example of time-stamped activity data 328 that can collected by data collection engine 302 is inertial sensor data obtained by inertial internal sensors of the ED 102, including gyroscope 130(5), accelerometer 130(6) and magnetometer 130(7). The inertial sensor data is collected and processed by the data collection engine 312 to provide an activity log or dataset. The activity log or dataset may include a plurality of successive time-stamped data entries. Each time-stamped data entry in the activity log or dataset can include information indicating an orientation or pose of ED 102 relative to three orthogonal axis, and instantaneous acceleration information relative to each of the three axis.

Another example of time-stamped activity data 328 that can collected by data collection engine 302 is a touchscreen interaction data which is processed by the data collection engine 302 to provide an activity log or dataset that may for example include a plurality of successive time-stamped data entries that each identify the location and magnitude of pressure applied on a touchscreen surface of display 132 at the instant of the time-stamped time.

Examples of time-stamped application use data 324 can include application use logs or datasets for each of the applications 156 that are associated with the timeline module 170, including for example application use logs or datasets that include a plurality of successive time-stamped data entries in which each entry includes information about activity data by the calendar 160(4) and tasks 160(6) modules, among other things. In some examples, the application use logs or dataset include time-stamped data entries that include information about one or more remote services 200 used by the ED 102 collected by the data collection engine 312 from APIs or information about widgets that are resident on the ED 102. For example time-stamped application data entries in an application use log or dataset may include weather information and local traffic information.

In at least some examples, the data included in timeline data log 322 is formatted as multi-dimensional feature vectors that can act as input data for neural networks used to implement other components of the timeline module 170 such as event processing engine 304 or prediction engine 310.

Figure 5:
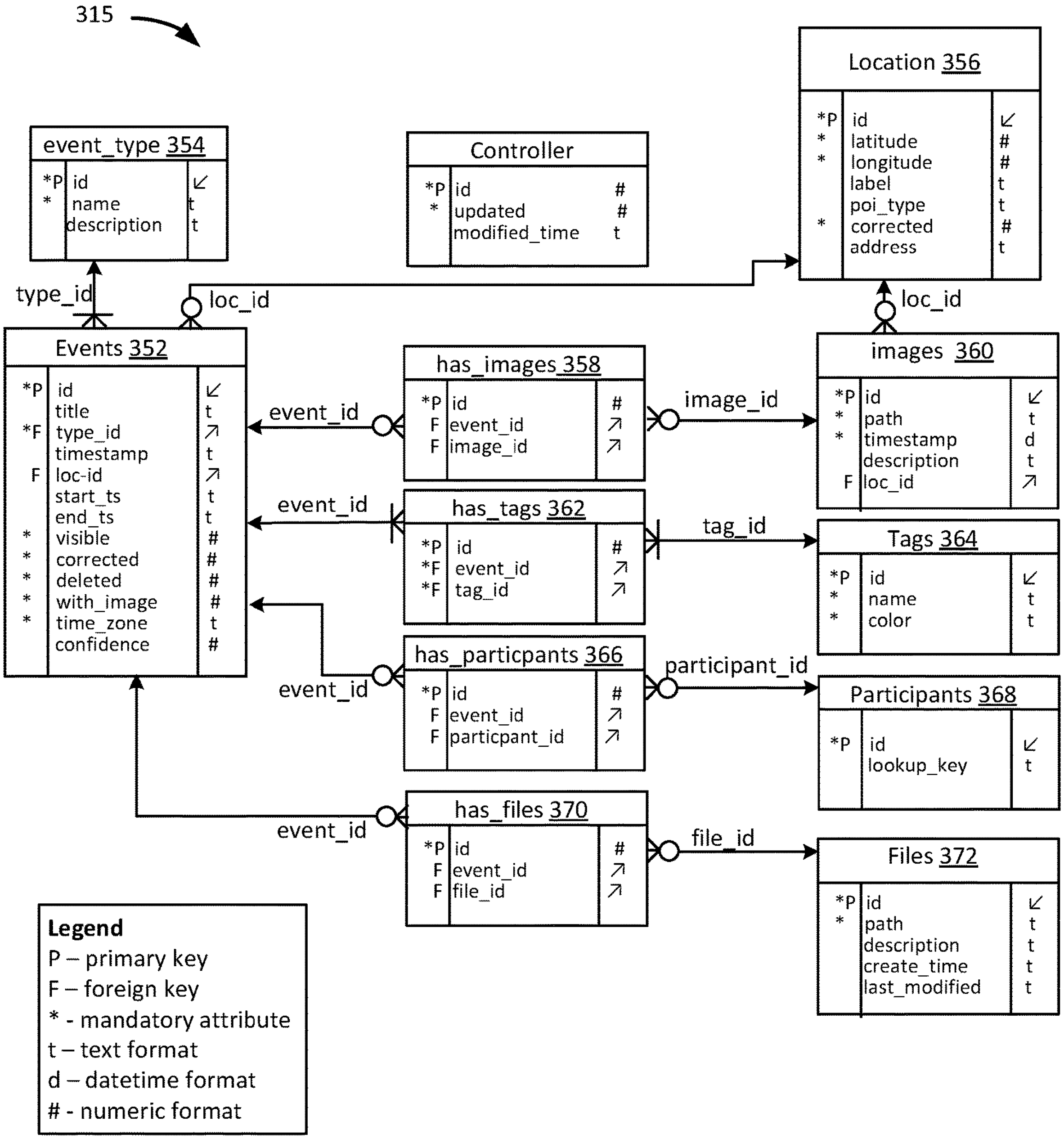
FIG. 5 is a database schema for event records stored in a timeline user database according to an example embodiment.

FIG. 5 illustrates, in the form of a database schema, an example of an event record 315. Event record 315 includes event element 352 and related elements 354, 356, 358, 360, 362, 364, 366, 368, 370 and 372. As indicated, event element 352 may include attributes that specify: a unique event ID (event_id); event title (title); event type (type_id); event record creation time (timestamp); location (loc-id); event start-time (start_ts); event end-time (end_ts); if event is to be displayed on timeline (visible); if event data has been manually corrected or modified by the user (corrected); if the event has been deleted by user (deleted); the logo image to be used when displaying the event (with_image); the time zone of the event (time_zone); and a confidence attribute for the event (confidence). The related elements 354, 356, 358, 360, 362, 364, 366, 368, 370 and 372 can specify the specifics for some of the attributes noted above (e.g. event_type 354, location 356) as well as information that specifies: if the event has associated images such as pictures, and a path to such images (has_images 358, images 360); identifying tags, if any, to use for representing the event on a timeline UI, and the attributes of such tags (has_tags 362, tags 364); information about any event participants (has_particplants 366, participants 368); and if the event has associated files, and a path to such files (has_files 370, files 372). The confidence attribute indicates a confidence in an accuracy that the planned event has been correctly generated.

As shown in FIG. 3, one category of event records 315 includes planned event records 318 for planned events that the ED user 50 is scheduled to participant in. Planned event records 318 are generated by the timeline module 170 for events that: (a) have been intentionally scheduled for the ED user 50 by or though one of the application modules 160 (e.g. calendar module 160(4) or task module 160(6)); or (b) have been intentionally scheduled by the ED user 50 through user timeline module 170. In example, embodiments, the planned event records 318 use the schema shown in FIG. 5. FIG. 6 is a table showing, by way of non-limiting example, specified types 604 of planned events. As shown in FIG. 6, the planned events fall into one of the two groups noted above, namely events scheduled through application modules 160 (other than the timeline module 170), and events scheduled by a user through the timeline module 170.

With respect to events that have been intentionally scheduled by or though one of the application modules 160, in some examples event processing engine 304 is configured to detect such events and generate respective planned event records 318 as follows. Data collection engine 302 is configured to log, as time-stamped application use data 324, information indicating when calendar entries are scheduled or modified by calendar module 160(4) and information indicating when task entries are scheduled or modified by task module 160(6). Event processing engine 304 is configured to monitor the time-stamped application use data 324 to detect scheduling events by calendar module 160(4) and task module 160(6), and then generate planned event records 318 to represent events scheduled by the calendar module 160(4) and task module 160(6). The corresponding planned event records 318 may, in various example embodiments, be populated with attributes that were collected by data collection engine 302, or were taken or derived by event processing engine 304 from data maintained by the calendar module 160(4) and task module 160(6).

Accordingly, in example embodiments, event processing engine 304 periodically receives time-stamped application use data 324 collected by data collection engine 302 from calendar module 160(4) indicating information about the addition of or modification of calendar events, and time-stamped application use data 324 from task module 160(6) indicating information about the addition of or modification of calendar events, and based on the time-stamped application use data 324 creates or modifies corresponding planned event records 318.

With respect to events scheduled by the user through user timeline module 170, in at least some examples, the timeline UI engine 312 is configured to allow a user to enter information about future appointments, meetings, tasks or reminders that can be used by event processing engine 304 to generate planned event records 318 for planned future events. In some examples, timeline UI engine 312 may interface with calendar module 160(4) and task module 160(6) to allow user 50 to add calendar events and task events to those modules (that may then be detected by data collection engine 302/event processing engine 304) when the user 50 is interfacing with the timeline UI engine 312.

As will be described in greater detail below, in some examples, event processing engine 304 is configured to proactively prompt the user 50 to enter information about future appointments, meetings, tasks or reminders based on the occurrence of an observed event.

As noted above, one category of event records 315 stored in timeline user database 314 are observed event records 316. In example embodiments, the observed event records 316 use the schema shown in FIG. 5. In example embodiments, event processing engine 304 is configured to detect the occurrence of observed events and generate and maintain observed event records 316 as follows. Event processing engine 304 is configured to continuously analyze time-stamped application use data 324, location data 326 and activity data 328 as it is collected and stored in the timeline data log 322 to detect triggers that indicate the occurrence of specified types of observed events. For each trigger that is detected, event processing engine 304 generates a corresponding observed event record 316 for the specified type of observed event. In at least some examples, the attributes included in the observed event records 316 are based on analyzed the time-stamped application use data 324, location data 326, and activity data 328 taken or derived from the timeline data log 322. In example embodiments, the specified types of observed events that event processing engine 304 is configured to detect are predetermined based on one or more of a combination of: an initial default list of event types; system updates and/or user inputs (through timeline UI engine 312) that add or remove types of events from the list; past user interactions with timeline module 170; the applications 156 that have been associated with the timeline module 170.

By way of example, FIG. 7 is a table 700 that includes a non-exhaustive list of the types of observed events (Observed event Type 704) that event processing engine 304 is configured to detect and record based on the time-stamped application use data 324, location data 326 and activity data 328 stored in timeline data log 322 and data stored in timeline database 314. In some examples, event processing engine 304 is rules based and applies curated rule sets when analyzing the time-stamped application use data 324, location data 326 and activity data 328 stored in timeline data log 322 and the data stored timeline user database 314 to detect triggers that signal the occurrence of specified observed event types 704. The rule sets may be human generated, machine learning generated, or a combination thereof. In some examples, rather than an express rule based system, a trained artificial intelligence (AI) engine such as deep learning neural network system trained to recognize data patterns associated with the observed event types 704 may be used to implement past event recognition functionality in event processing engine 304. In some examples, a combination of both rules-based processing and trained neural network processing may be used to recognize events.

As indicated in FIG. 7, the types of observed event types 704 that event processing engine 304 is configured to detect and record can be separated into categories 702 for ease of processing, including for example "Location" events, "User Activity" events and "Application Usage" events. By way of example, location events relate to a geographic location of the ED 102 determined based on time-stamped location data 326, and can include event types 704 such as those shown in table 700 (e.g. "work" corresponds to the detected observed event of "at work".) In example embodiments, observed events that fall within the "Location" category may be detected by event processing engine 304 based primarily on time-stamped location data 326.

As indicated in FIG. 7, observed events that are primarily related to application usage (e.g., modules 160) as tracked through time-stamped application use data 324 may be classed in an "app usage" category, that may for example, include event types such as those shown in table 700. By way of example, detectable event type "Pay Bill" may be determined based on application use data 324 collected in respect of a specific financial services module (App C) (e.g. one of the web services module 160(14)) present on the ED 102. In example embodiments, app usage events can include events detected in respect of the timeline module 170 itself, including for example user interaction with the timeline UI.

Observed events that are primarily related to kinodynamic properties of the ED 102 and user interaction with the ED 102 as tracked through time-stamped activity data 328 may be classed in an "user activity" category, that may for example include event types such as those shown in table 700. The events and categories shown in FIG. 7 are one representative example and numerous other observed events types and categories may be defined in various embodiments.

Once an observed event is detected, event processing engine 304 generates a corresponding observed event record 316 for the event that includes, among other data, a time stamp indicated when the event was detected, along with other information as specified in the schema of FIG. 5. Referring to FIG. 8, table 802 provides an example of the types of information that may be included in or inferable from observed events records 316 for location category events, and table 804 provides an example the types of information that may be included in or inferable from observed events records 316 for app usage events.

As can be appreciated from the Schema of FIG. 5, observed event records 316 may be hierarchal—for example, a location type observed event record may include embedded information about an app usage type event (e.g. —"has_images"). As shown in the schema of FIG. 5, as well as tables 802 and 804, the event records 315 for observed events and planned events each include an unique event ID assigned by event processing engine 304, along with a set of event attributes which include time information (e.g. start time, end time) and event type, among other things.

As noted above, a third category of event records 315 is predicted event records 320. In example embodiments, predicted event records 320 are generated by prediction engine 310 in respect of otherwise unplanned or unscheduled future events. In example embodiments, predicted event records are also configured in accordance with the schema of FIG. 5. An overview of the operation of prediction engine 310 to predict events and generate predicted event records 320 will now be described. Prediction engine 310 is configured to continuously analyze the event records 315 (including observed event records 316, planned event records 318 and predicted event records 320), the user profile 321 and timeline data log 322, in order to predict the occurrence of specified types of events. Once predicted, these events become "predicted events", and prediction engine 310 generates a corresponding predicted event record 320 for each such event.

Although planned event records 318 and predicted event records 320 will typically both pertain to future events at the time that they are generated, a distinction between the two is that planned event records 318 are generated for events that have been intentionally scheduled or planned, whereas predicted event records 320 are generated for events that have not been intentionally scheduled or planned but rather are predicted from inferences made at least in part from data stored in the timeline user database 314.

In example embodiments the specified types of events that prediction engine 310 is configured to detect are predetermined based on one or more of a combination of: an initial default list of event types; system updates and/or user inputs (through timeline UI engine 312) that add or remove types of events from the default list; past user interactions with timeline module 170; and which of the application modules 160 that are associated with the timeline module 160.

By way of example, FIG. 9 is a non-exhaustive list of the types of events (Predicted Event Types 900) that prediction engine 310 is configured to predict based on the data stored in timeline user database 314. In the example of FIG. 9, the predicted event types can include events that can be classed as suggestion events that prompt ED user 50 to take a specific action (e.g. order food, order transportation), and reminder events that remind ED user 50 of an upcoming event that may or may not require action on the part of the ED user 50 (e.g. a delivery of an item ordered on-line that should be arriving at the user's home at a specific time).

In some examples, the prediction engine 310 is rules based and applies curated rule sets when analyzing the time-stamped application use data 324, the location data

326, and the activity data 328 stored in timeline user database 314 to predict the occurrence of specified event types 900. The rule sets may be human generated, machine learning generated, or a combination thereof. In some examples, rather than an express rule based system, a trained artificial intelligence (AI) engine such as a deep learning neural network system trained to recognize data patterns associated with the event types 904 may be used to implement event prediction functionality in prediction engine 310. In some examples, a combination of both rules-based processing and trained neural network processing may be used to recognize events.

In example embodiments, the predicted event records 320 generated by prediction engine 310 include information that specifies attributives similar to those discussed above in respect of observed event records 316 and the planned event records 318, including for example: Unique event ID; Time stamp of record creation, Type of Predicted Event; Event Start Time; Event End Time; Event Duration, Additional Event Information. In at least some examples, the predicted event records 320 for at least some of the predicted events also include a confidence attribute. In such cases, the confidence attribute can be a confidence value assigned to the predicted event record 320 by prediction engine 310 that represents a likelihood that the predicted event corresponding to the predicted event record 320 will occur. In some examples, the confidence attribute may be a binary value indicating whether the confidence meets a threshold confidence level. For example, prediction engine 310 may assign a confidence attribute of "1" to predicted event records 320 corresponding to predicted events that are predicted primarily based on planned events, and an attribute of "0" to predicted event records 320 corresponding to predicted events that are predicted primarily based on past events.

In at least some example embodiments, planned events records 318 are also each assigned a confidence attribute that may for example have a default above the threshold confidence level (e.g. a "1").

In example embodiments, timeline UI engine 312 is enabled to allow a user to add additional planned event records 318 to the records generated by event processing engine 304 and prediction engine 310. In example embodiments, timeline UI engine 312 is enabled to allow a user to edit event record attributes or delete event records 315, including observed event records 316, planned event records 318, and predicted event records 320.

It will be appreciated that planned event records 318 and predicted event records 320 will typically, at the time that they are generated, be for future events. At some point, actual time will pass the event start time (start_ts) and end time (end_ts) specified in the event record, and the events will become transpired or past events. In example embodiments, event processing engine 304 may be configured to determine based on one or more of the time-stamped application use data 324, location data 326 and activity data 328 if a planned event or predicted event actually occurred and flag the planned event record 318 corresponding to the planned event or the predicted event record 320 corresponding to the predicted event with an event verification flag to indicate if the event occurred or not. In some examples, the confidence attribute discussed above for a future event may be used as the event verification flag once the event time has passed.

Figure 10:
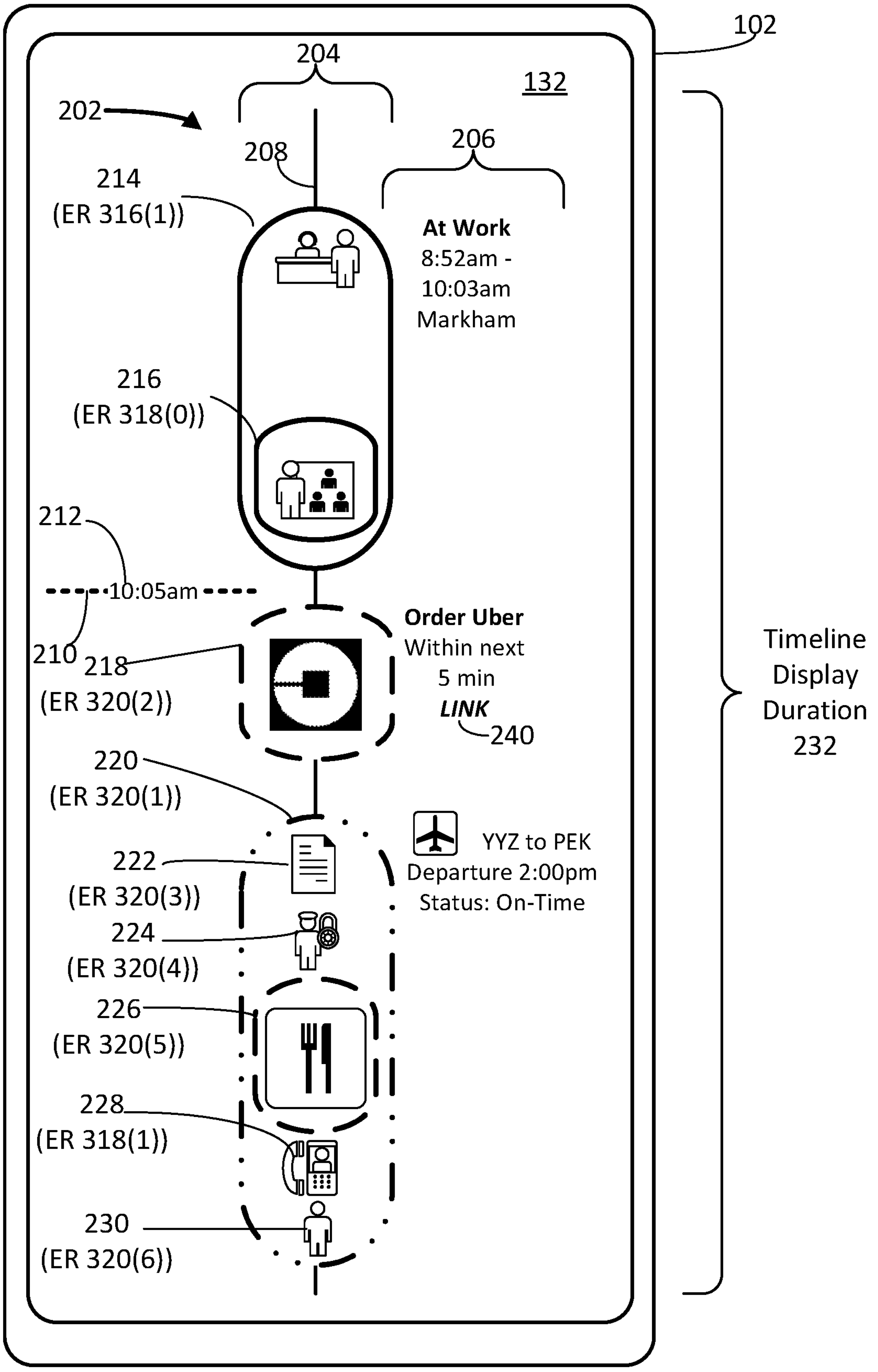
FIG. 10 is a schematic representation of a graphical user interface (GUI) presented on a display screen of the ED of FIG. 2 according to example embodiments.

FIG. 10 illustrates an example of a timeline graphical user interface (GUI) 202 that may be generated by timeline UI engine 312 and displayed on the display screen 132 of ED 102. In the example of FIG. 10, GUI 202 includes a column of on-screen graphical elements, referred to herein as event icons 204, that extend along a vertical line 208. The event icons 204 each represent a respective timeline event (e.g., observed event, planned event or predicted event) that has a corresponding event record, represented in FIG. 11, stored in timeline user database 314. For example, in FIG. 10, the reference numeral for each event icon is followed in brackets by the event record (ER) reference numeral from FIG. 11 that the event icon corresponds to (e.g.: event icon 214 corresponds to event record 316(1), event 216 corresponds to event record 318(0), etc.). The event icons 204 represent timeline events occurring within a timeline display duration 232, and are arranged in chronological order from top to bottom on the line 208, with a horizontal line providing an on-screen current time indicator 210. Event icons 204 may each include graphic image that indicates the event type for the event that the icon represents. Event icons 204 include past event icons 214, 216 located before (e.g. above) the current time indicator 210, and future event icons 218, 220, 222, 224, 226, 228 and 230 located after (e.g. below) the current time indicator 210.

In example embodiments, the GUI 202 is a scrollable display object and user interaction (for example swipe down and swipe up) can be used to change the time of the displayed timeline duration 232. For example the displayed timeline duration 232 could have a default setting to represent events over a 7 hour duration, including 3 hours of past events and 4 hours of future events, and a user can scroll down so that the displayed 7 hour window shows additional future events and fewer (or no) past events. In some examples, the time period covered by displayed timeline duration 232 can be scaled (e.g. expanded or contracted) through user interaction, for example by using finger pinching and finger spreading screen interactions. In some examples, the duration and time scaling of the displayed timeline duration 232 can be performed automatically by the timeline UI engine 312 based on the number of event icons to be displayed.

In some examples, GUI 202 is a semi-transparent display object that overlays a further GUI (for example a home-screen GUI) presented on display 132.

As indicated in FIG. 10, a column of additional information 206 in the form of text and/or graphics may be displayed adjacent the event icons 204 to provide additional information about each of the corresponding events. In alternative embodiments, rather than in the vertical column format shown in FIG. 10, the timeline and event icons 204 could be oriented as a horizontal timeline format or a circular timeline format or other manner. Furthermore, the event icons could be organized in reverse chronological order rather than chronological order. In at least some examples, the timeline formation and order used in GUI 202 may be user configurable.

In at least some example embodiments, different display properties can be applied to the event icons 204 to distinguish between past events and future events. Furthermore, in some embodiments, different display properties can be applied to the event icons 204 to distinguish between future events that have been assigned a high confidence value that exceeds a confidence threshold and those that have been assigned a low confidence value. By way of example, in FIG. 10, the solid border around event icons 214 and 216 indicate events that have occurred in the past, the consistent length dashed line borders around event icons 218 and 226 indicate lower confidence future events, and the dashed-dot line borders around the group of event icons 222, 224, 228 and 230 indicate higher confidence future events. Although different border lines (e.g., solid line, consistent dash line, dashed-dot border line) are shown in FIG. 10 to distinguish between event icons for past and future events and/or events having different confidence levels, other visual differentiating properties can alternatively be applied such as different icon border and background colors and/or different icon shapes.

In example embodiments, the number of observed events, planned events, and predicted events for any given timeline display duration 232 will typically exceed the screen space available to legibly display event icons corresponding to all such events. As can be seen in the schema of FIG. 5, "Events" element 352 can include an attribute "visible" that specifies whether the event that corresponds to the event record is to be displayed on the timeline. In example embodiments, the timeline UI engine 312 is configured to select a subset of events (e.g. events that include a predefined visible attribute) from the event records 315 for inclusion in the timeline display duration 232 that is displayed on-screen as part of GUI 202. In the illustrated example of FIGS. 10 and 11, only the sub-set of event records that correspond to displayed event icons in FIG. 10 are represented in FIG. 11. In example embodiments, a set of predefined rules are used by the engines 302, 304, 310, 312 of the timeline module 170 to select which of the events falling within a timeline display duration 232 are to be represented by corresponding event icons 204 in the GUI 202. In some example, these rules can be user defined, and in some examples they may be learned by timeline UI engine 312 based on previous user interactions.

An example of the collective operation of the engines 302, 304, 310 and 312 of timeline module 170 that results in the GUI 202 of FIG. 10 to represent the event records that are represented in FIG. 11 will now be described. In this regard, the generation of event icon 214 will be described according to an example embodiment. Event icon 214 represents a detected "At Work" type event that corresponds to an observed event record 316(1) stored in timeline user database 314. As noted above, data collection engine 302 interacts with timeline data log 322 that stores time-stamped application use data 324, location data 326 and activity data 328. The time-stamped location data 326 includes logs or datasets comprising data entries indicative of information from location service module 160(8). Event processing engine 304 processes the time-stamped location data 326 to detect physical location based events. In the particular example of FIGS. 10 and 11, event processing engine 304 detects that following a period of ED 102 movement (which may for example be detected as a "User Activity-subway" event), ED 102 remains within a geographic boundary for threshold duration of time beginning at 8:52 am. Based on the stored time-stamped activity data 326, event processing engine 304 also determines that during this time the ED 102 occasionally moves within the geographic boundary, and thus has not been left unattended by the user ED 50. Based on information included in user profile record 321, event processing engine 304 further determines that the geographic boundary corresponds to the user's primary work location. Based on these deductions, the processing engine 304 determines that the ED user 50 is at work, and creates "work" observed event record 316(1) with a starting time (start_ts) of 8:52 am and corresponding location information. In example embodiments, event processing engine 304 continues to monitor the location services dataset 600 and updates the "At Work" observed event record 316(1) to include an end time 10:03 am upon detecting that the ED 102 moves outside of a geographic region that corresponds to the user's work location.

In the illustrated example, "At Work" event types are included within the types of events that the timeline user interface 312 is configured to display as part of GUI 202, and accordingly the timeline user interface 312 causes event icon 214 to be included within the relevant timeline display duration 232. As shown in FIG. 10, the event icon 214 is displayed in GUI 202 with an icon length that corresponds to the length of time of the detected "At Work" event. However, other graphical configurations could alternately be used to display the "At Work" event, such as distinct graphic markers for "Arrive At Work" and "Left Work" in place of a continuous icon; similarly, the "At work" observed event record 316(1) stored in timeline user database 314 could be supplemented with, or replaced by, "Arrive At Work" and "Left Work" event records.

Figure 12:
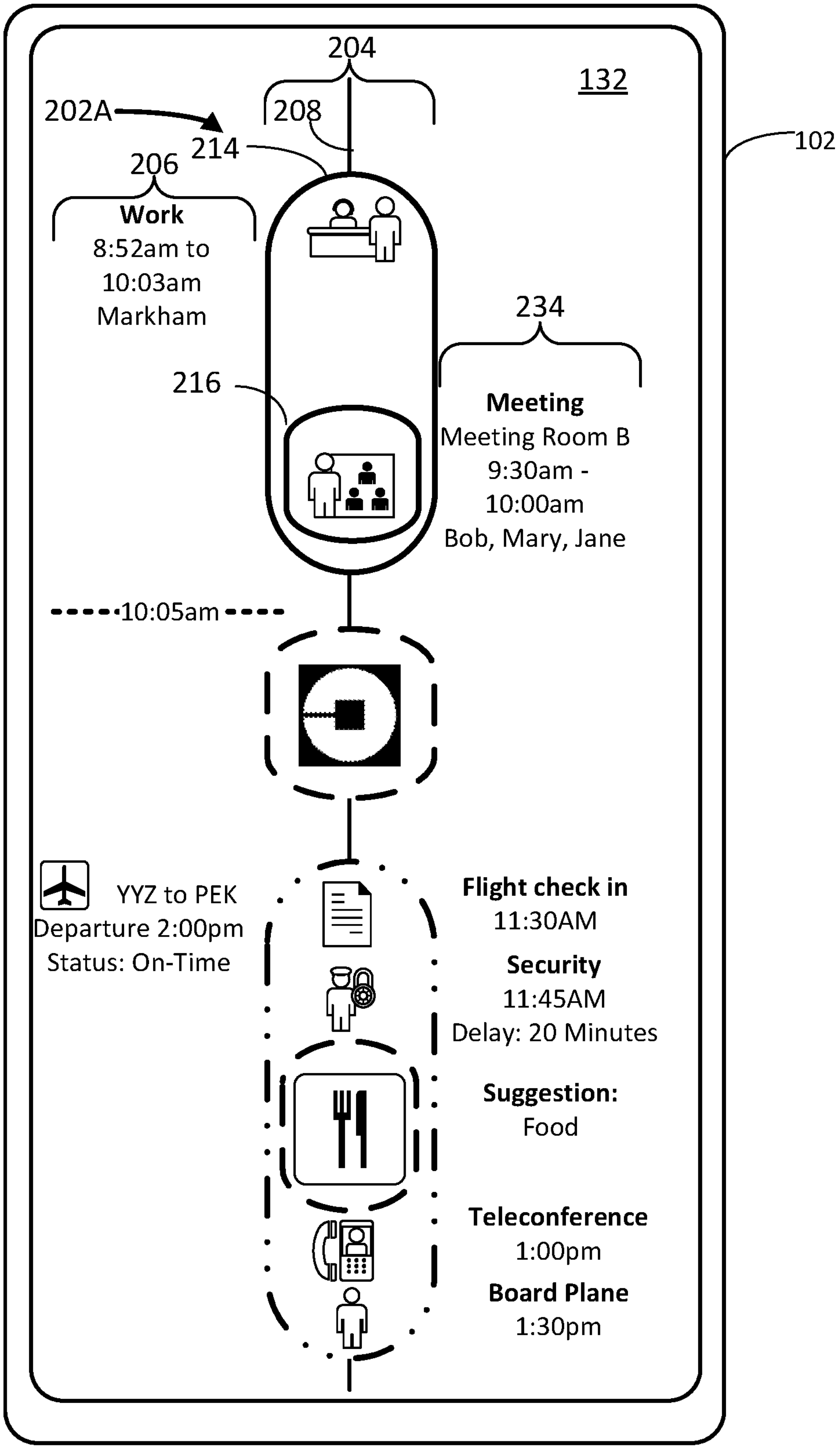
FIG. 12 is a schematic representation of an augmented version of the GUI of FIG. 10.

In example embodiments, multiple concurrent and/or overlapping events may have corresponding event records stored in timeline user database 314, which is illustrated in FIG. 10 by "Meeting" event icon 216 that is nested within the "At Work" event icon 214. In the illustrated embodiment, the "Meeting" event icon 216 is generated by the timeline user interface 312 based on a planned event record 318(0) stored in timeline user database 314 for a scheduled meeting type event that occurred at the user's work location. In example embodiments, additional information for events represented by nested event icons can be displayed on by timeline UI engine 312 in response to predefined user input (for example a swipe left). By way of example, augmented GUI 202A is shown in FIG. 12 in which a column of supplemental information 234 is displayed for the nested icons of the GUI 202 of FIG. 10, and the information 206 for top level event icons is shifted from the left side of the timeline 208 to the right side thereof. As illustrated, the supplemental information for the meeting represented by event icon 216 is acquired directly or indirectly from the attributes of the corresponding event record 318(0) and includes information such as the type of event, time start and time end, meeting room location, and attendee information. In example embodiments, the timeline UI engine 312 will return to GUI 202 from 202A upon receiving a predetermined user input (e.g., a swipe right) or after a predetermined period of user inactivity.

Figure 13:
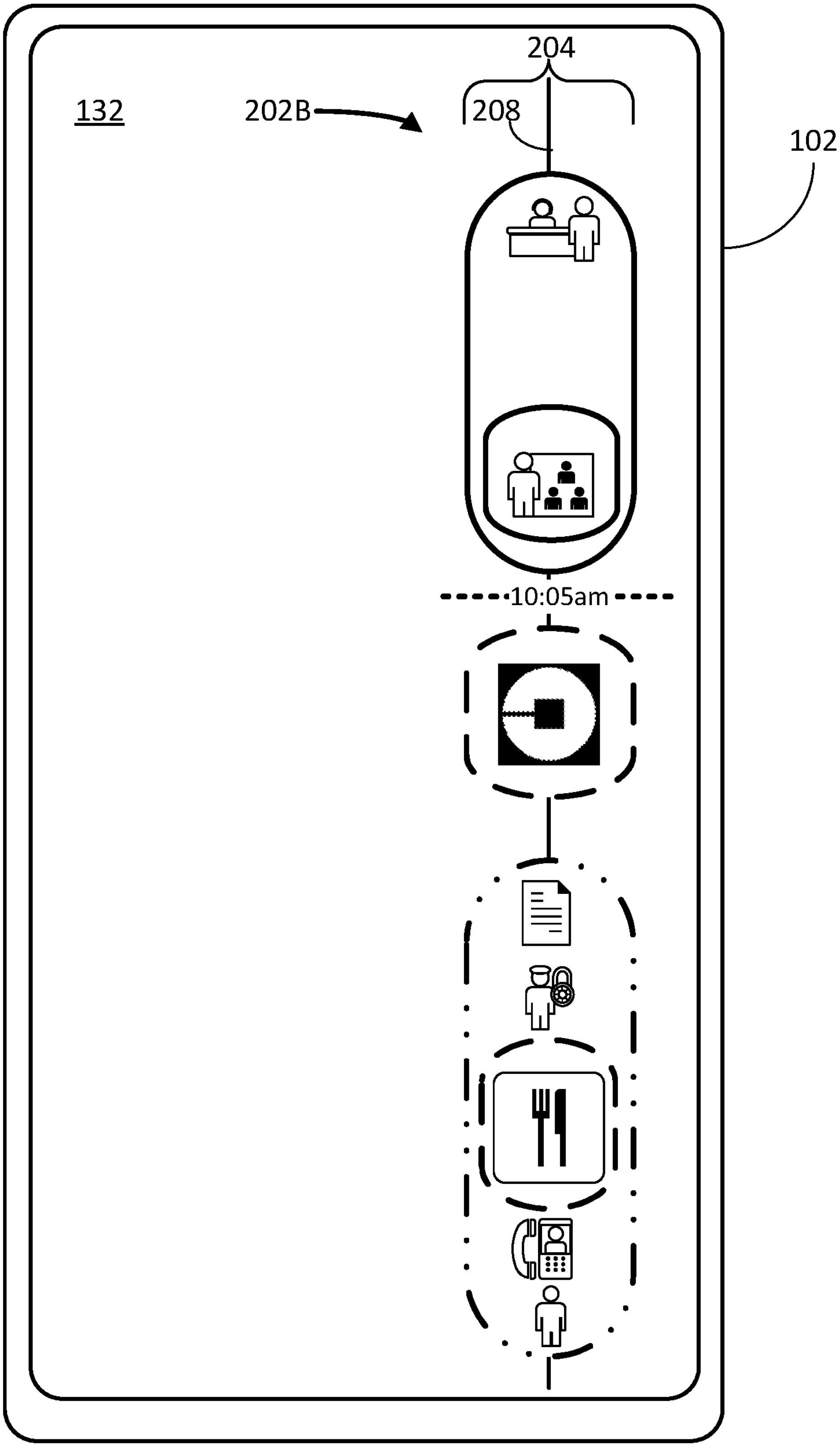
FIG. 13 is a schematic representation of a basic version of the GUI of FIG. 10.

In some example embodiments, a simplified or basic version of GUI 202, which is shown as GUI 202B in FIG. 13, may be displayed on display 132. Basic GUI 202B includes less information than the GUI 202, for example GUI 202B may include only the event icons 204 for timeline events, without any further descriptive text. In some examples embodiments, basic GUI 202B may be the default GUI presented by timeline UI engine 312, and may be presented in a semi-transparent state over a left side region of the home screen of ED 102. A predefined user interaction (e.g., left swipe) causes the more detailed GUI 202 of FIG. 10 to be displayed with additional information for at least some of the timeline events, and a further user interaction (e.g. another left swipe) causes the even more detailed GUI 202A of FIG. 13 to be displayed.

As shown in FIG. 11, the planned events records 318 generated by event processing engine 304 includes a planned event record 318(2) that specifies the following attributes: Event ID: 1109; Type: Travel, Fight; Departure 2:00 pm YYZ (Toronto Pearson IA); Arrival 3:30 PM PEK (Beijing Capital IA); Confidence: 1. In at least some examples, all of the information shown in FIG. 11 may not be directly included in the planned event record 318(2), but rather included in one or more files that are linked through the event record (e.g. "has_files" element 370 and "files" element 372). In an example embodiment, event processing engine 304 has generated event record 318(2) in response to the generation of a corresponding calendar event by calendar module 160(4) that was collected by data collection engine 302.

In example embodiments, prediction engine 310 is configured to predict, based on event records 315 and user profile 321 316 actions or information that may be useful for the ED user 50 in the future. For each such prediction, prediction engine 310 generates a corresponding predicted event record 320 that can then used by the timeline user interface 312 to present a suggested action, relevant information, and/or reminder for the ED user 50 at an appropriate time. In the example of FIGS. 10 and 11, the presence of a planned event record 318(2) is detected by prediction engine 310, causing the prediction engine 310 to generate a set of the predicted event records 320(1) to 320(6) that represent information and suggested actions in respect of the planned event record 318(2).

For example, based on the flight data included in planned event record 318(2), prediction engine 310 deduces that the fight is a long-haul international flight and that ED user 50 should be at the airport at least three hours (e.g. at 11:00 am) before scheduled takeoff. In this regard, prediction engine 310 predicts a "pre-travel" event that will involve a preflight duration of three hours at YYZ airport, and generates a corresponding event record 320(1) that includes a set of attributes for the event, including: "Event ID: 1113; Type: Pre-Travel, Fight; Start Time: 11:00 am; End time 2:00 pm; Location YYZ; Confidence: 1".

In example embodiments, prediction engine 310 is configured to detect when a future planned or predicted event may require an action (such as ordering a car service), and then generate a corresponding predicted event record 320(2) for a suggestion event for that action. By way of example, prediction engine 310 is able to deduce that ED user 50 will need to get to YYZ, and predict an Uber® order suggestion event that is then represented in timeline user database 314 as predicted event record 320(2). In at least some examples the Uber® order suggestion event and its associated attributes may be predicted based on one or more of the following: (a) event records 315 includes observed event records 316 based on application use data 324 indicating that the ED user 50 regularly gets Uber® rides to YYZ airport; (b) event records 315 indicate the location of ED user 50 prior to departing for the airport; (c) based on user location, the time lead time required to order an UBER® ride to get to the airport for an arrival 3 hours before the flight time, (which may be based on event data records 315, and/or current information obtained from an Uber® application module on ED 102).

In the example of FIG. 11, the predicted event record 320(2) for the Uber® ride event is assigned a "0" or low confidence attribute value as event data records 315 indicates that the user occasionally also takes an express train to the YYZ airport. In example embodiments, the prediction engine 310 is configured to review and update predicted event records 320. For example, subsequent to an initial creation of predicted Uber® ride event record 320(2), new information may become available about the user location or traffic congestion or a flight delay that requires the ED user 50 to get a ride earlier to the airport, or allows the ED user 50 to leave later for the airport.

As indicated in FIG. 10, timeline UI engine 312 causes an event icon 218 that corresponds to Uber® ride event record 320(2) to be displayed on timeline GUI 202. Supplementary information may be displayed next to the icon, and the timeline GUI 202 may include a user selectable link 240. User selection of the user selectable link 240 (for example, user tapping a graphical link location on the display 132) causes a web service module 160(4) (e.g. an Uber® application present on ED 102) to be presented on display 132, pre-populated with destination information, to allow user 50 to order an Uber® ride with a minimal amount of interaction with ED 102. The event record 320(2) status is updated to show that the Uber® ride has been ordered, and may also include an anticipated arrival time. Once the user minimizes or closes the web service module 160(4), the supplemental information presented on GUI 202 for the Uber® ride event icon 218 is updated to show the new status (e.g.: "Ordered: anticipated arrival 5 minutes").

As shown in FIGS. 10 and 11, the prediction engine 310 may also be configured to predict a number of nested predicted events, based at least in part event data records 315, that will occur during the duration of the "pre-travel" event represented by event record 320(1). For example, such predicted events could include: (a) a "check-in" reminder event to remind the ED user 50 to go to airport check-in/baggage drop-off (event record 320(3), event icon 222); (b) a "security" reminder event to remind user 50 to proceed through security on a timely fashion (event record 320(4), event icon 224); (c) a "meal" suggestion event suggesting that the user get a meal before boarding (event record 320(5), event icon 226); and (d) a "board plane" reminder event to remind user 50 to board at a specific gate in a timely fashion (event record 320(6)).

As indicated in FIG. 12, supplemental information 234 for each of the nested event icons can be accessed by the ED user 50 with a left swipe that will cause augmented timeline GUI 202A to be displayed.

As shown in FIGS. 10-12, one of the events represented in timeline GUI 202 is a teleconference meeting event, represented by event icon 228 which corresponds to planned event record 318(1), that is scheduled to occur during the "pre-travel" event represented by event icon 220. In example embodiments, planned event record 318(1) is generated by event processing engine 304 based on an event scheduled through the calendar module 160(4). However, in at least some example embodiments, event processing engine 304 is configured to detect, based on time-stamped application use data 324, location data 326, and activity data 328 stored in timeline data log 322 and/or past events records 315, possible events that the ED user 50 may want to schedule a planned event in respect of, and then facilitate scheduling of the event. By way of example, event processing engine 304 can be configured to detect when a received message (for example a message processed through SMS module 160(7) or a social media module 160(17)) includes time information, and then trigger timeline UI engine 312 to facilitate creation of a planned calendar event record 318 in respect of the event.

Figure 14:
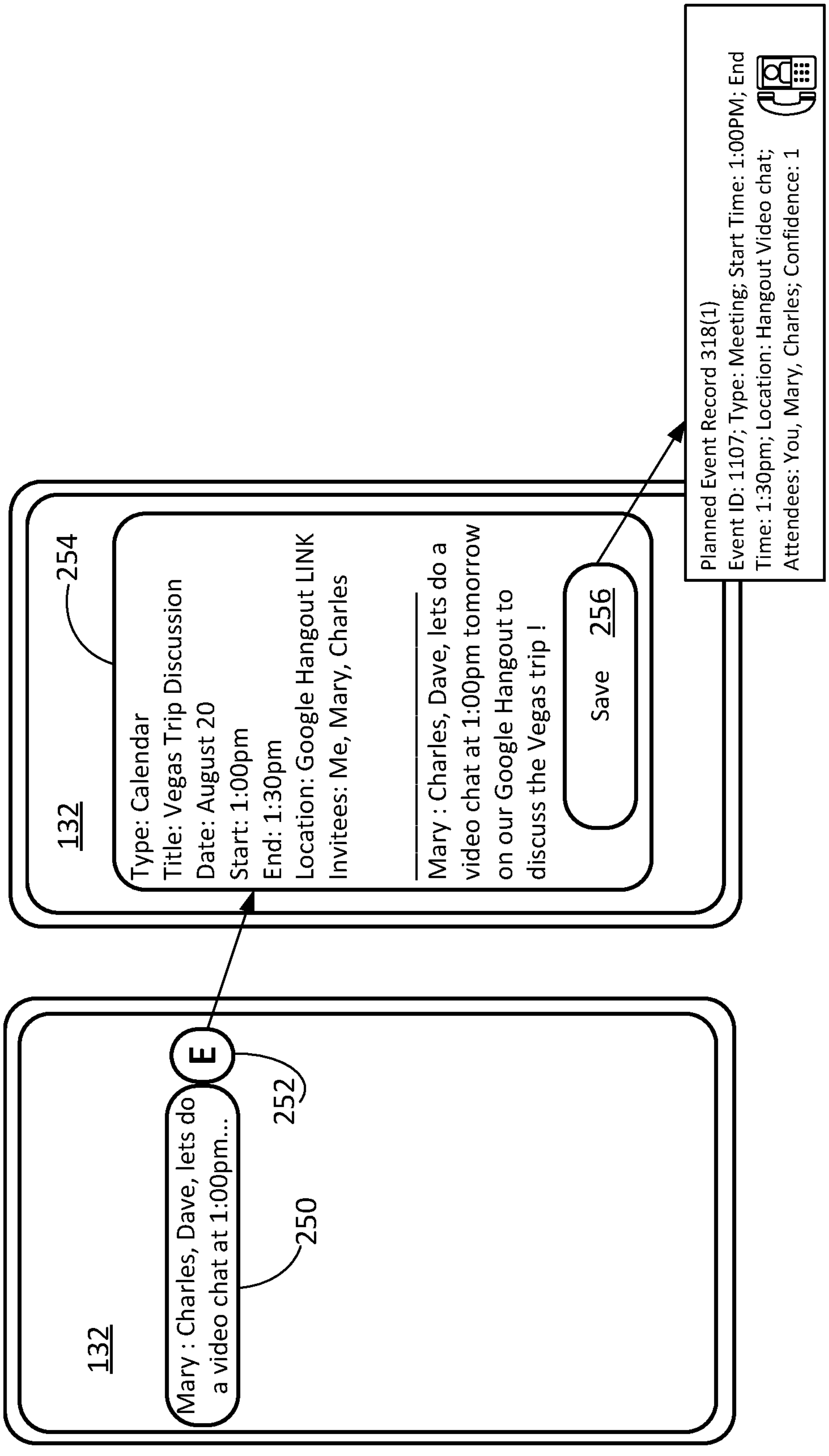
FIG. 14 illustrates creation of a planned event record by the timeline module based on a received text message, according to example embodiments.

In this regard, FIG. 14 shows an example of a received text message notification 250 that is shown on a home screen of the display 132 ED 102. The generation of text message notification 250 by the relevant module 160 (for example SMS module 160(7)) is collected and processed by data collection engine 302 which generates one or more corresponding logs or datasets and includes the one or more corresponding logs or datasets in time-stamped application use data 324, which in turn are processed by event processing engine 304. Based on the logs or datasets included in the application use data 324, event processing engine 304 detects the presence of text message notification 250 that include tome information and causes timeline UI engine 312 to visually flag the text message notification 250 with a visual indicator 252 indicating that information about a possible event is included in the text message. A predefined user input (for example user selection indicated by a screen tap at the location of the visual indicator 252) causes an interactive planned event creation window 254 to be displayed to allow the ED user 50 to create a planned event based on the content of the text message. In some examples, the fields of planned event creation window 254, which may be user editable, are automatically populated based on information deduced at least in part form the content of the text message, and in some examples, from information of past events stored in event records 315. For example, information about a Google® Hangout® used by the same message group participants in the past may be available from event records data 315. A further predefined user input (e.g. selection of a displayed on-screen "save" button 256) results in the saving of planned event record 318(1) in future event date records 316. In some examples, the timeline UI engine 312 may interface with other modules 160 such as calendar module 160(4), contacts module 160(5) and selected web services modules 160(14) (e.g. Google® Hangout® client application present on ED 102) to generate the content of interface window 254 and planned event record 318(1)), and possibly also generate corresponding records in the databases of these other modules 160 for the event and/or cause event invitations to be sent to other participates by the other modules 160.

Accordingly, it will thus be appreciated that timeline module 170 can allow a future event to be scheduled and confirmed with minimal user interaction with ED 102 and without requiring the ED user 50 to manually access multiple different modules 160.

Turning again to FIG. 10, in example embodiments the timeline user interface 312 is configured to cause ED 102 to perform predefined actions when a user input is received in respect of one of the events that correspond to an event record 315 in timeline user database 314. By way of example, user selection of one of the event icons 204 (for example by a tap on the screen location of the displayed event icon) will result in respective set of actions by ED 102. In example embodiments, the set of actions may be based on one or more of: (a) the type of event represented by the event icon; (b) the location of the ED 102 at the time of the selection; (c) the time of selection relative to the time of the event; (d) a status of the event; (e) which of timeline GUI 202, 202A and 202B is displayed at the time of selection.

By way of example, selection of UBER® ride event icon 218 at any point up to 20 minutes before the scheduled time for ordering the UBER® may result in information about the planned event being presented (for example, expected dive duration based on current traffic). However, selection of the Uber® Ride event icon 218 at any point within 20 minutes of the scheduled time for ordering may result in timeline user interface 312 interfacing with the Uber® Ride client application to allow the ED user 50 to order an Uber® ride. Selection of the Uber® Ride event icon 218 after status has changed to "ordered" may result in an estimated arrival time being presented, which may be obtained by timeline user interface 312 from the Uber® Ride client application.

Similarly, selection of the scheduled teleconference event icon 228 at any time up to 2 minutes before the scheduled time may result in information about the planned event being presented. However, selection of the teleconference event icon 228 at any time within 2 minutes of the scheduled time for may result in timeline user interface 312 interfacing with the Google Hangout® client application to allow the ED user 50 to directly join in the Google Hangout video chat.

In some examples, user selection of the icon for an event will case timeline UI engine 312 to present the user with an edit screen that allows the user to edit one or more attributes of the corresponding event record 315 and save the edited event record. In some examples, "Events" elements includes an attribute "corrected" that is used to indicate when an event record 315 has been edited, and this information may be used to improve future operation of prediction engine 310.

Figure 15:
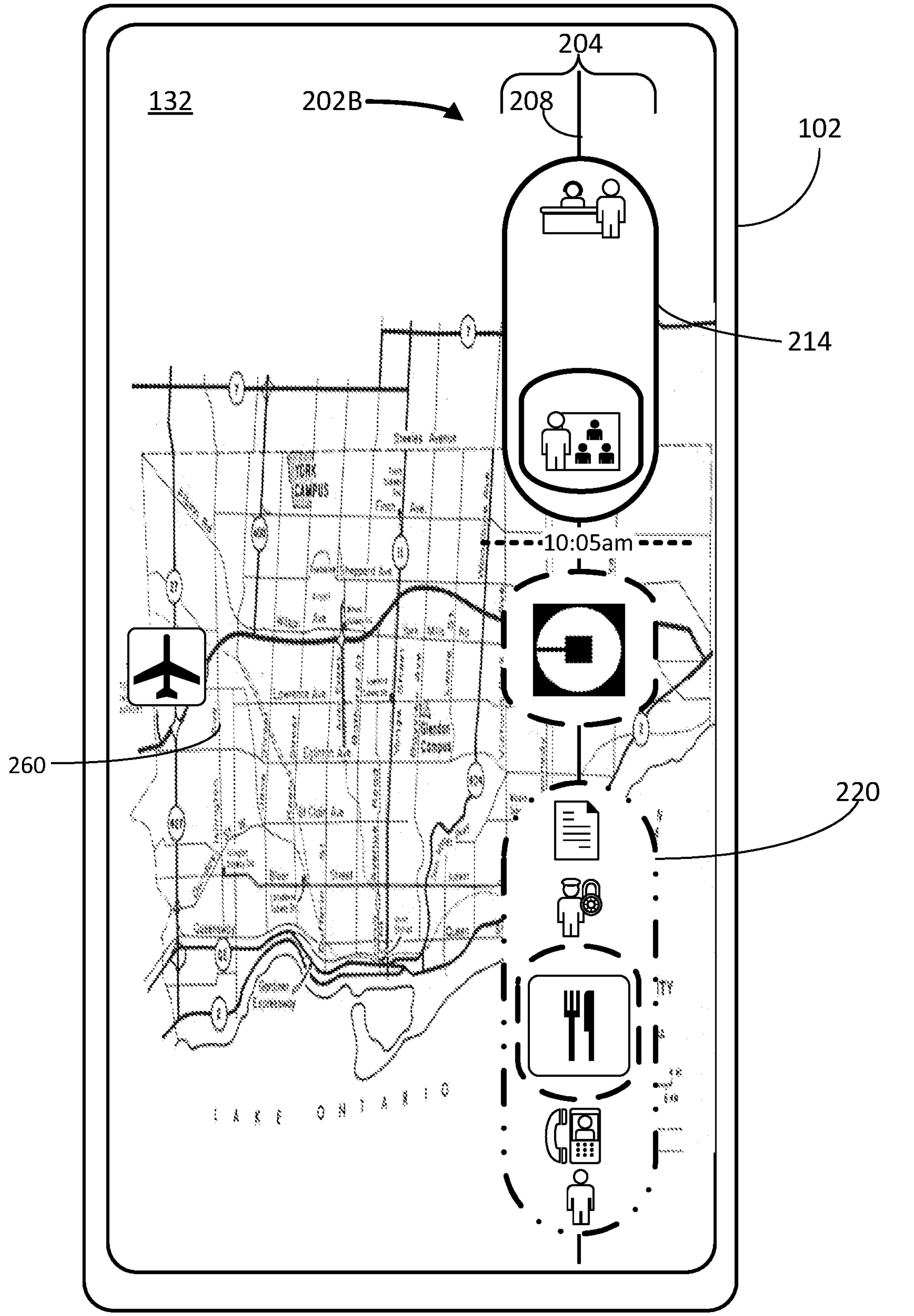
FIG. 15 is a representation of a timeline module GUI showing map information, according to example embodiments.
Figure 16:
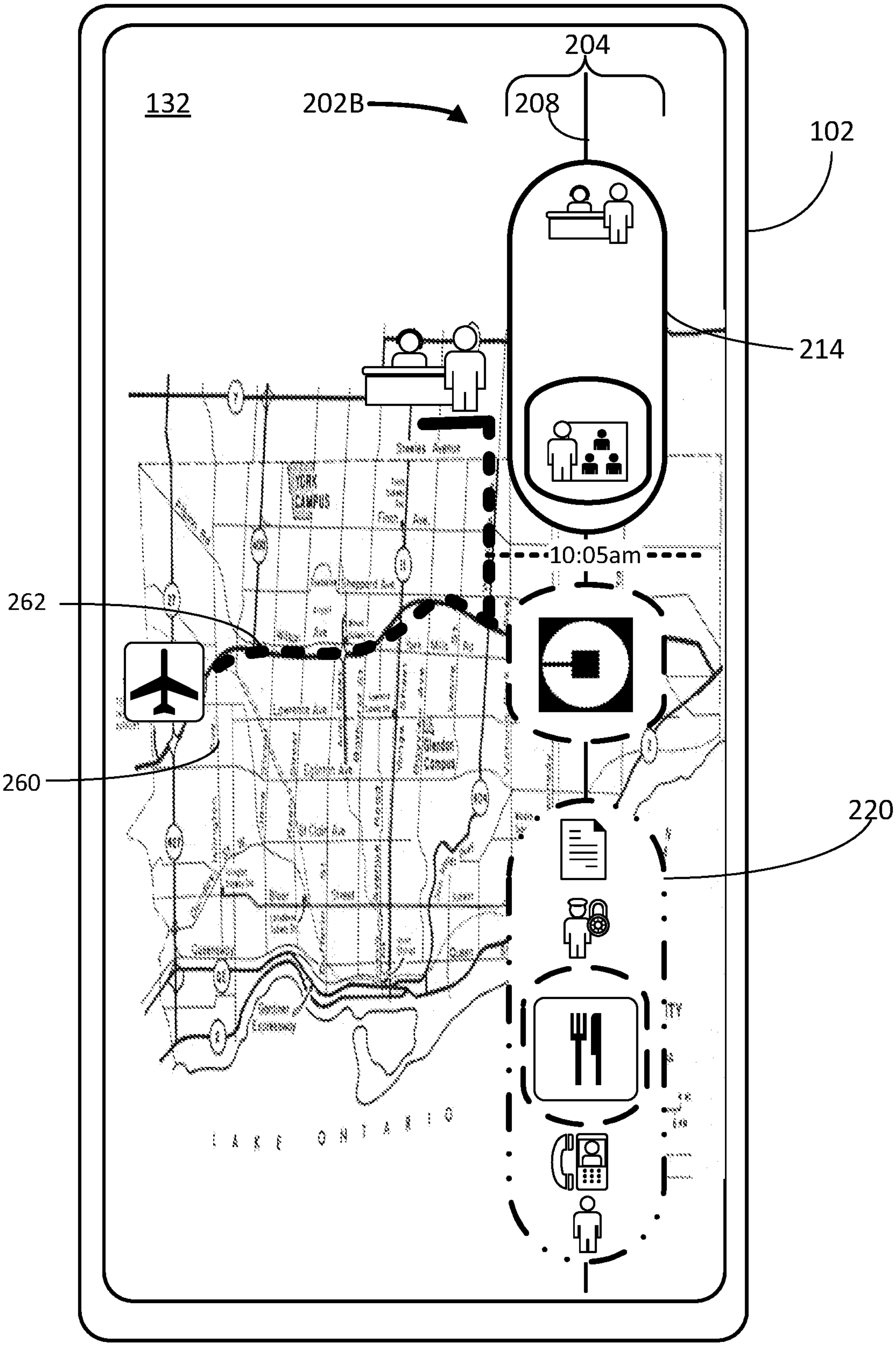
FIG. 16 is a representation of a further timeline module GUI showing map information, according to example embodiments.

In some examples, in at least some circumstances, timeline UI engine 312 is configured to interface with map module 160(9) and present map location upon user selection of an event icon. By way of example, FIG. 15 shows map information 260 for YYZ airport displayed on display 132 in response to user selection of the "pre-travel" event icon 220. In some examples, user input in respect of two events causes timeline UI engine 312 to interface with map module 160(9) to present map information showing a route information between locations of the events. By way of example, FIG. 16 shows map information 260 with route information 262 for travel from the ED user 50's work to YYZ airport, displayed on display 132 in response to simultaneous user selection of "at work" event icon 214 and "pre-travel" event icon 220 (e.g., simultaneous touching by the ED user 50 using a thumb and a finger of the screen locations of "at work" event icon 214 and "pre-travel" event icon 220).

In some examples, the timeline UI engine 312 may be configured to automatically display map and route information on display 132 when the timeline module 170 recognizes that there a location gap between two consecutive events, By way of example, referring again to FIG. 16, timeline UI engine 312 may automatically display map information 260 with route information 262 for travel from the ED user 50's work to YYZ airport upon detecting the location gap between the observed event (work) and the predicted event (airport).

Figure 17:
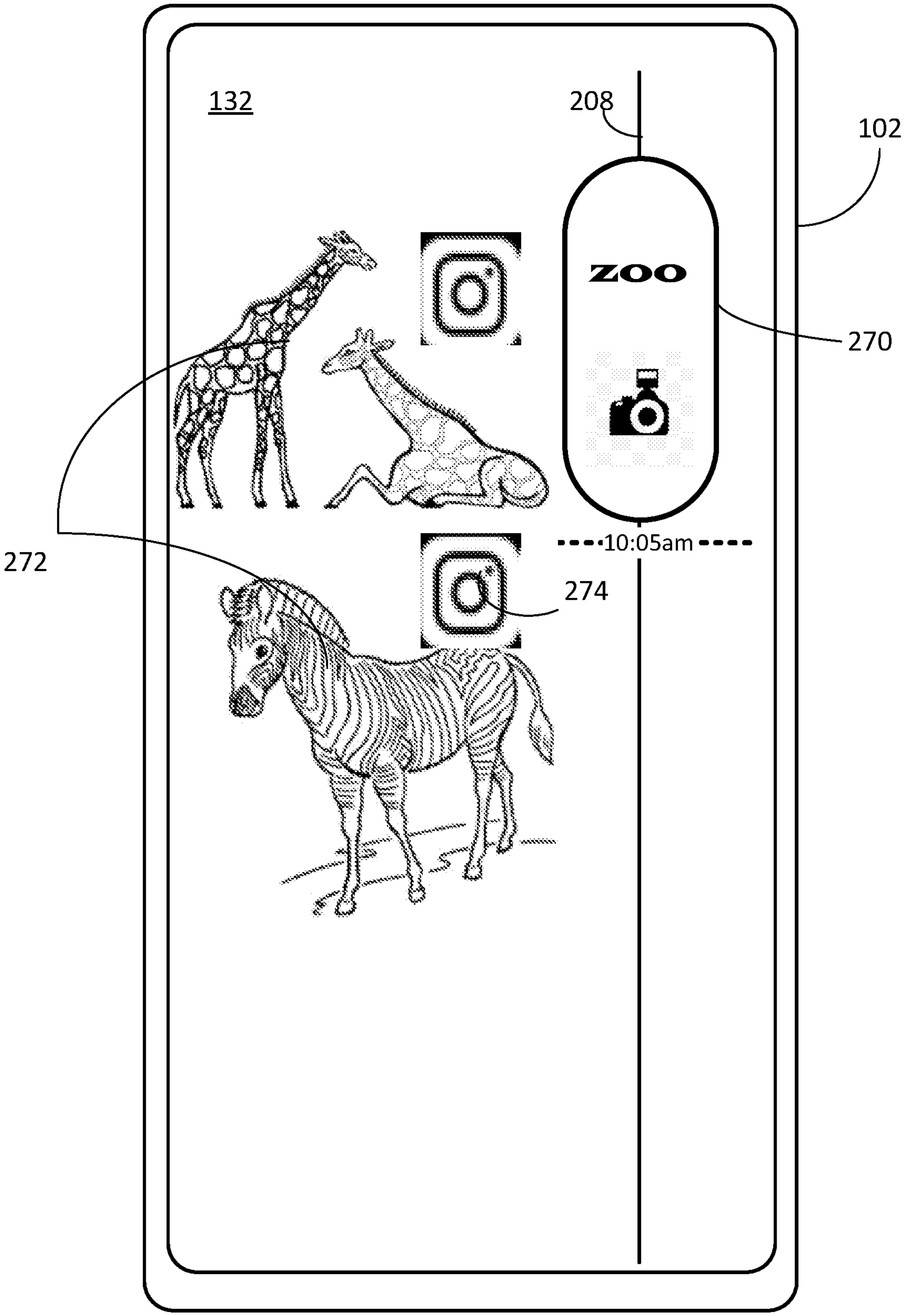
FIG. 17 is a representation of a timeline module GUI showing pictures associated with a timeline event, according to example embodiments.

In some example embodiments, an event may have one or more pictures linked to or associated with the event record 316 (e.g. has_images element 358 and images element 360) for the event, and user selection of an event icon representing the past event may cause the timeline UI engine 312 to display thumbnails of the associated pictures on the display 132, and options regarding such pictures (for example an Instagram® link to post pictures on the users Instagram account). An example is shown in FIG. 17, which illustrates an event icon 270 for an event that has been detected and classed by event processing engine 304 based on location information over a duration of time as a "Visit Zoo" event. The corresponding event record includes a flag or element (e.g. has_images element 358) to indicate that pictures were taken using ED 102's camera module 160(10) during the event. Timeline UI engine 312 displays an event icon 270 for the event that include an indicator (e.g. image of camera) that photos are associated with the event. Upon user selection of the event icon 270, images data 272 for the photos taken during the relevant time period of the event at the relevant location of the event are displayed on display 132. As shown in FIG. 17, an Instagram® logo 274 is displayed, which can be selected by the ED user 50 to cause the corresponding image to be uploaded to remote service 200 and distributed to a default Instagram group previously specified by the ED user 50 through his or her Instagram client application.

As will be appreciated from the above description, event processing engine 304 and predictive engine 310 are configured to detect timeline events and create corresponding event records based at least on data that is included in timeline data log 322 and timeline user database 314, among other data. In some examples, one or more of the engines of timeline module 170 may be configured to apply one or both of temporal and spatial reasoning algorithms to assist in detecting and prediction events. For example, temporal reasoning may be based on combining observations about: (a) what applications and modules are used by the ED user 50 at certain times; (b) what activities the ED user 50 is participating in during, before or after those times; (b) the location of ED 102 during, before or after those times and/or during certain activities. In some examples timeline event records may be created to determine the types of temporal based events that are worth tracking as events, including for example: User used Waze/Spotify while driving (which may, for example, then be used as the basis on which to predict a timeline suggestion event for the ED user 50 to turn on Waze® or Spotify® when the user is approaching his or her vehicle); user went to McDonalds® and then to nearby Tim Hortons® (which may for example be used to predict a timeline event for a visit to Tim Hortons® when the user is at the nearby McDonalds®); user visited Sport Check® during work hours (which may for example be used to predict a timeline event for a visit to Sport Check® during an upcoming lunch break); user has had a busy weeks because she has had 12 meetings and has not been to the gym (which may for example be used to predict a timeline event to visit to gym). Spatial Reasoning may for example be used to create events or information based primarily on location data, user lives at 123 Maple St.

Figure 18:
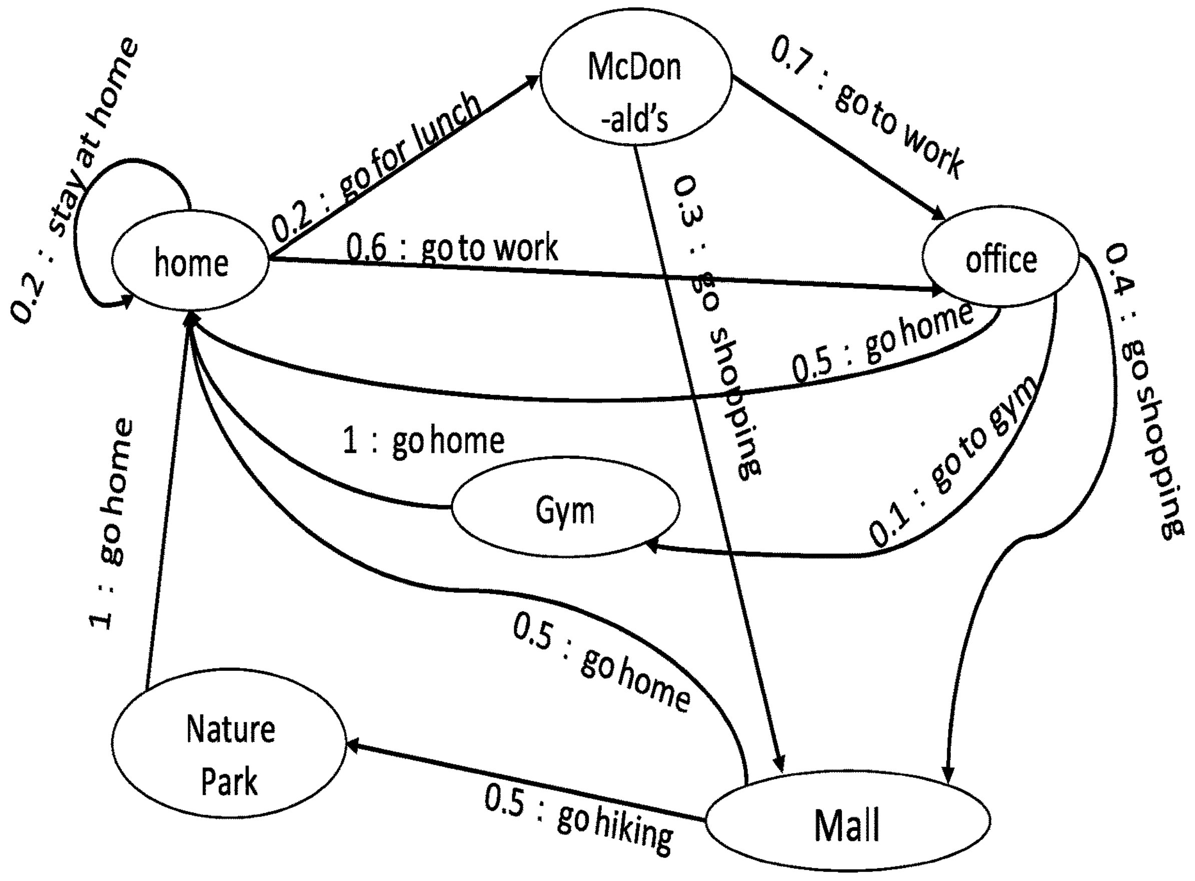
FIG. 18 is a representation of possibility model, according to example embodiments.

In some examples prediction engine 310 may be configured to implement a Bayesian network to predict future events based on estimations of the user's intentions (in example embodiments, the ED user's 50 intention is defined as a change in the user's status). From the perspective of timeline module 170, the ED user's 50 intention (i.e. a change in the user's status) may be estimated based current assessment of the current ED user 50 status in a plurality of categories such as user location, user fatigue, time of day, past user activity, etc. The prediction engine 310 may, based on past event data 316 and currently sensed information, designate a node attribute for a respective time window, and then generate a possibility model in which probabilities for alternative events are determined based on the current assessment of the ED user 50 status for the plurality of categories. By way of example, FIG. 18 illustrates one example of a possibility model for a plurality of events within a time window. As indicated, a possibility value is assigned to different options that are available to the user based on information included in event records 315. The prediction engine 310 is configured to predict future events, and create corresponding predicted event records, based on which events have the highest possibility value. By way of illustration, in an example scenario, event processing engine 304 detects, based at least on location data 326, that the ED user 50 is at work (labelled "office" in FIG. 18). Based on a combination of at least some of the location, time, day of the week, past observed event records 316, and planned event records 318, the prediction engine 310 predicts likely next actions that the ED user 50 will take and normalized possibility values for each of the those actions (e.g. 0.5-go home; 0.1-go to gym; 0.4 go shopping). Based on the predicted possibility values, the prediction engine 310 predicts a suggested observed event (e.g. go home) and generates a corresponding predicted event record 320, which may for example include a suggested departure time and link to map information.

Accordingly, in some examples, predicting events includes assigning possibility values to a plurality of candidate events based on characteristics of the user and selecting the candidate event with the highest possibility value as a predicted event.

In example embodiments, timeline UI engine 312 is configured to allow ED user 50 to scroll the timeline display duration 232 of displayed timeline GUI 202 forward to see event icons 204 for future events, and backwards to see event icons 204 for past events. This feature conveniently allows a user to see what they have done in the past and what they are planning or predicted to do in the future. As noted above, user interaction with a displayed event icon 204 can result in different information or options being displayed to the user, including bringing up images associated with a past event, showing map information, ordering a ride for a future event, editing information about the event, among other things.

Figure 19:
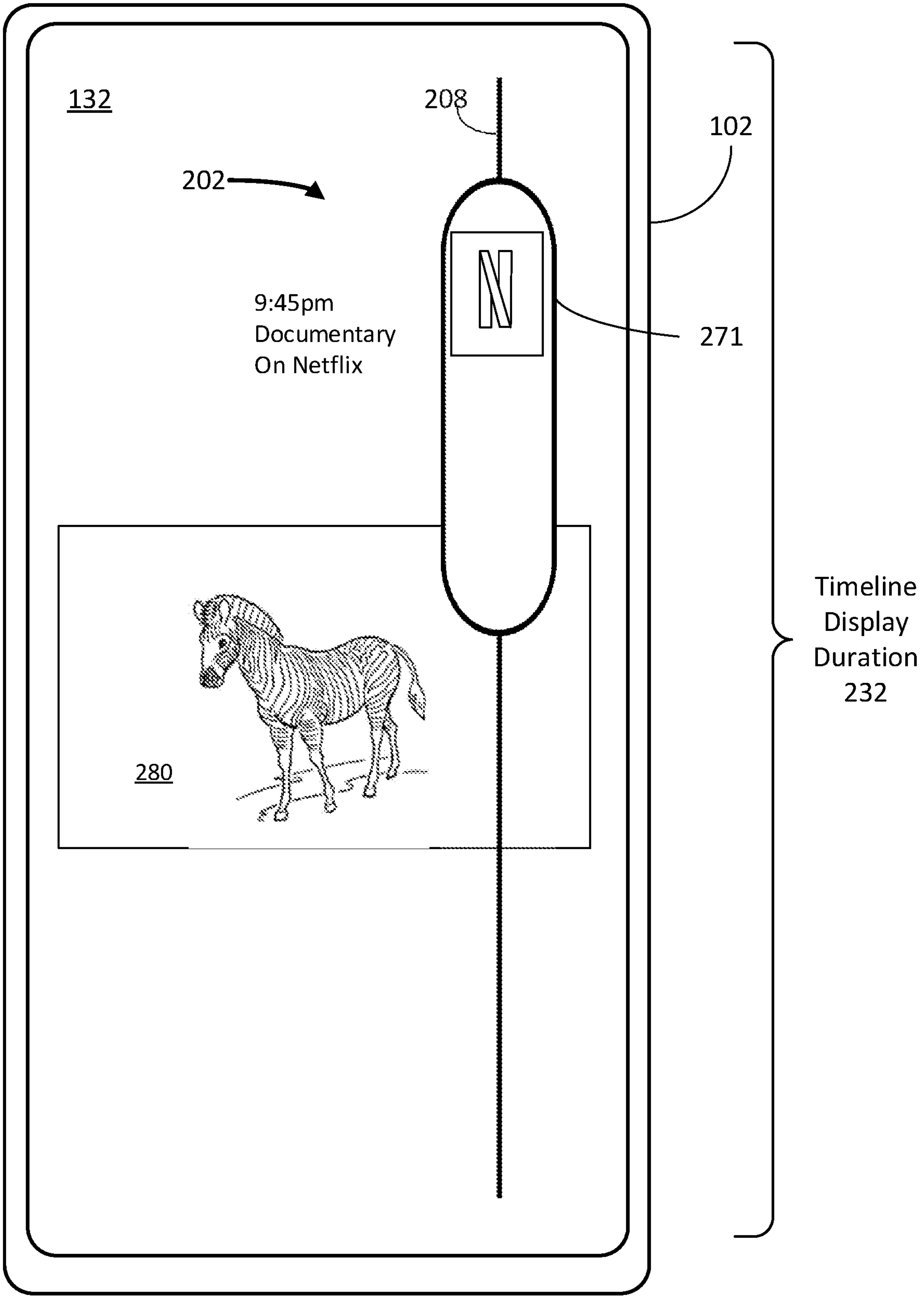
FIG. 19 is a representation of a timeline module GUI showing a content shortcut feature.

Another example of possible action taken in response to user interaction with a displayed event icon 204 is shown in FIG. 19, which illustrates an example in which a displayed event icon 204 can be used as a shortcut to view media content provided by one of the applications 156 on ED 102. In the example of FIG. 19, one of device modules 160 is a video streaming module (for example, a Netflix® client application). Event processing engine 304 has detected that the user partially watched a Netflix® documentary, and generated a corresponding observed event record 316 that includes information including when the documentary was paused. At some point in the future, ED user 50, who is unable to immediately recall what streaming service they were watching the documentary on, decides to continue watching the video. Instead of the ED user 50 having to go through the time and resource consuming exercise of opening and closing the various streaming apps on the ED 102 and searching for the partially watched documentary, the ED user 50 simply has to scroll back the timeline display duration until the event icon 271 that represents the event record for the paused streaming event appears on the displayed timeline GUI 202. The timeline GUI 202 shows that the user stopped watching a documentary film on Netflix, and the detected viewing history is shown on the past timeline as event icon 271. When the user taps the event icon 271, a preview 280 of the Netflix application window (which shows the last scene the user watched) is displayed in the background on display 132. The ED user 50 can resume the film at the point he/she stopped by tapping the preview 280, which causes the Netflix application window to open and resume the video.

Although the GUIs 202, 202A and 202B are graphical, in at least some examples timeline user interface 312 is configured to present some or all of the timeline content as audio output or as tactile output, and to receiver user input through means other than touch screen contact, including for example through voice input.

Figure 20:
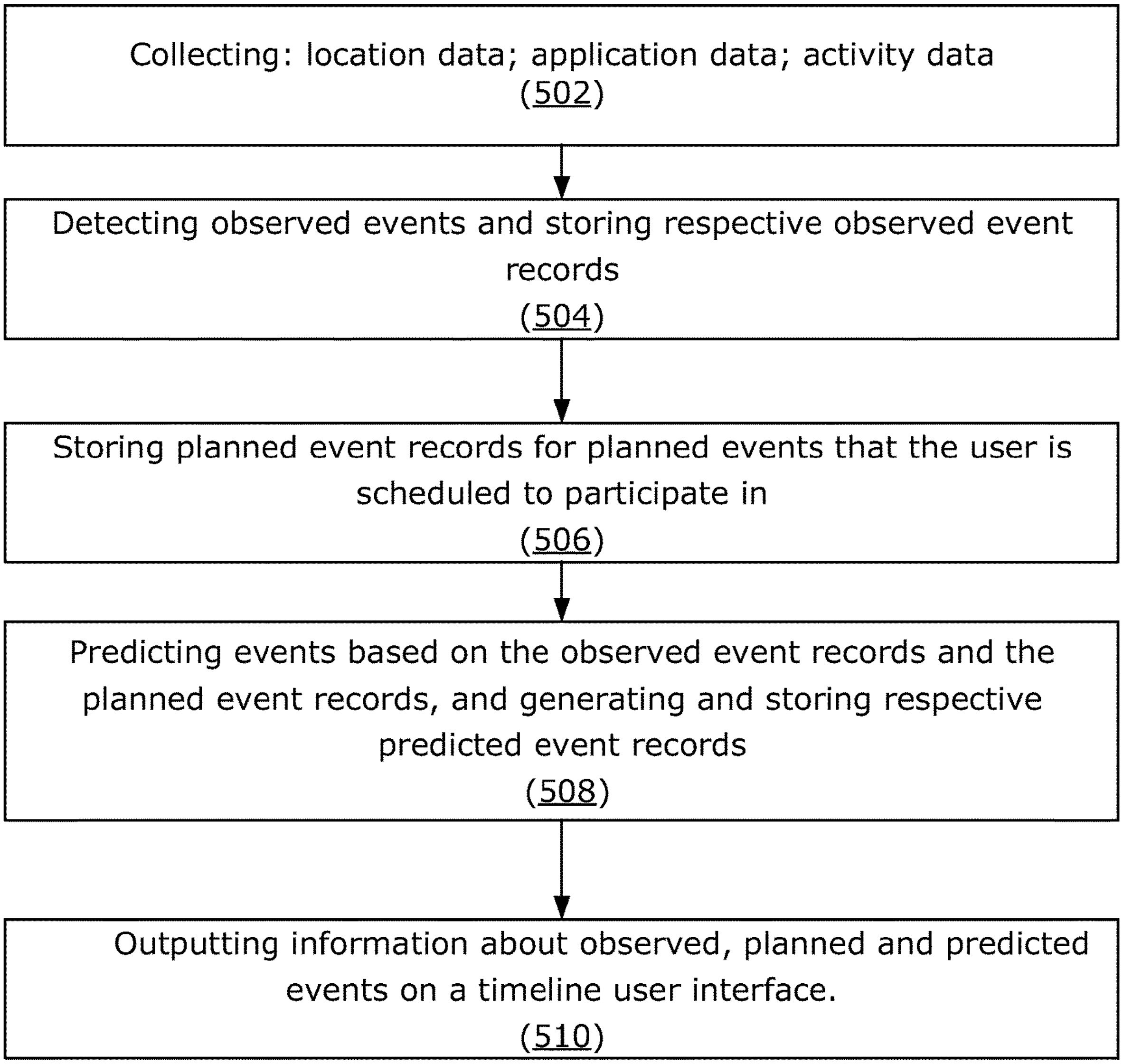
FIG. 20 shows a method performed by the timeline module according to example embodiments.

In summary, according to example embodiments a method for generating a user timeline for a user associated with an electronic device (ED) is disclosed. As shown in FIG. 20, the method includes: collecting, during operation of the ED, data that includes: location data for the ED; application data received from a plurality of applications used by the ED; and activity data from one or both of input devices and sensing devices of the ED (Action 502); detecting occurrences of predetermined types of observed events based on the collected data, and for each detected occurrence storing a respective observed event record that includes data about a time and type of the observed event (Action 504); storing planned event records for planned events that the user is scheduled to participate in, the planned event records each including data about a time and type of a respective planned event (Action 506); predicting events based on the observed event records and the planned event records, and for each predicted event, generating and storing a respective predicted event record including data about a time and type of the of the predicted event (Action 508); and outputting information about observed, planned and predicted events on a timeline user interface based on the observed event records, planned event records and predicted event records, respectively (Action 510).

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for generating a user timeline for a user associated with an electronic device comprising:

collecting, during operation of the electronic device, data that includes: location data for the electronic device; application use data received from a plurality of applications used by the electronic device; and activity data from one or both of input devices and sensing devices of the electronic device;

detecting occurrences of predetermined types of observed events based on the collected data, and for each detected occurrence storing a respective observed event record that includes information about a time and a type of the observed event;

storing planned event records for planned events that the user is scheduled to participate in, the planned event records each including information about a time and a type of a respective planned event;

predicting occurrences of predicted events including an occurrence of a first predicted event and corresponding nested predicted events, based on the observed event records and the planned event records, wherein the nested predicted events comprise a sequence of predicted events corresponding to a respective observed event record or a respective planned event record, that are predicted to occur during a duration of the first predicted event;

storing predicted event records for the first predicted event and the corresponding nested predicted events, the predicted event records each including information about a time and a type of the of a respective predicted event;

generating a timeline user interface on a display of the electronic device, based on the observed event records, the planned event records and the predicted event records; and outputting information about the observed events, the planned events and the predicted events on the timeline user interface based on the observed event records, the planned event records and the predicted event records, respectively.

2. The method of claim 1 wherein predicting events is also based on previously stored predicted event records.

3. The method of claim 1 wherein predicting events comprises assigning possibility values to a plurality of candidate events based on the stored event records, and selecting the candidate event with the highest possibility value as the predicted event.

4. The method of claim 1 wherein outputting information about observed, planned and predicted events comprises generating a timeline graphical user interface (GUI) on a display of the electronic device that includes graphical event indicators that each represent a respective observed, planned or predicted event record.

5. The method of claim 4 comprising assigning a confidence attribute to predicted events, wherein the graphical event indicators represent the confidence value assigned to the predicted event represented thereby.

6. The method of claim 4 wherein the timeline graphical user interface comprises a scrollable display object that displays graphical event indicators representing at least one of: observed, planned and predicted event records that have time information corresponding to a displayed timeline duration.

7. The method of claim 6 wherein the scrollable display object is semi-transparent and is displayed over further information displayed on the display.

8. The method of claim 4 comprising, in response to detecting a predefined user input selecting one of the graphical event indicators, causing a predefined action to be taken by the electronic device.

9. The method of claim 8 comprising determining the predefined action based on one or more of: (a) the event type information of the event record represented by the selected graphical event indicator; (b) a location of the ED at the time of detecting the predefined user input; (c) a time of selection relative to a time of the future event.

10. The method of claim 8 wherein at least some of the observed event records identify a shortcut to content accessible through one or more of the applications used by the electronic device, wherein the predefined action the selected graphical event indicator represents one of the observed event records that identifies a shortcut is to enable the shortcut.

11. The method of claim 10 wherein the content is video content and the shortcut enables the video content to resume viewing the video content at a specified location at which video viewing was previously suspended.

12. The method of claim 4, wherein predicting events includes predicting a travel suggestion event upon determining that a location gap exists between a location of the electronic device and a location of a future event.

13. The method of claim 4 comprising displaying, as part of the timeline graphical user interface, map and route information between events that have respective event records represented by graphical indicators on the timeline graphical user interface.

14. The method of claim 4 wherein the planned event records correspond to events that are scheduled on calendar or task application modules, events that are input through the timeline graphical user interface, and events that are based on information extracted from messages received by the electronic device through a network.

15. An electronic device, comprising:

a display screen;

a processor;

a memory coupled to the processor storing executable instructions, which when executed by the processor cause the processor to generate a user timeline for a user associated with the electronic device by:

collecting, during operation of the electronic device, data that includes: location data for the electronic device; application use data received from a plurality of applications used by the ED; and activity data from one or both of input devices and sensing devices of the electronic device;

detecting occurrences of predetermined types of observed events based on the collected data, and for each detected occurrence storing a respective observed event record that includes information about a time and type of the observed event;

storing planned event records for planned events that the user is scheduled to participate in, the planned event records each including information about a time and type of a respective planned event;

predicting occurrences of predicted events including an occurrence of a first predicted event and corresponding nested predicted events, based on the observed event records and the planned event records, wherein the nested predicted events comprise a sequence of predicted events corresponding to a respective observed event record or a respective planned event record, that are predicted to occur during a duration of the first predicted event;

storing predicted event records for the first predicted event and the corresponding nested predicted events, the predicted event records each including information about a time and a type of the of a respective predicted event;

generating a timeline user interface on the display screen based on the observed event records, the planned event records and the predicted event records; and outputting information about the observed events, the planned events and the predicted events on the timeline user interface based on the observed event records, the planned event records and the predicted event records, respectively.

16. The electronic device of claim 15 wherein the memory includes storage that stores a timeline user database that includes the observed event records, planned event records, and predicted event records and wherein the predicted events are predicted based on previously stored predicted event records.

17. The electronic device of claim 15 wherein the electronic device includes a display screen and outputting information about observed, planned and predicted events comprises generating a timeline graphical user interface (GUI) on the display that includes graphical event indicators that each represent a respective observed, planned or predicted event record.

18. The electronic device of claim 17 wherein the timeline GUI comprises a scrollable display object that displays graphical event indicators representing observed, planned and/or predicted event records that have time information corresponding to a displayed timeline duration.

19. The electronic device of claim 18 wherein the scrollable display object is semi-transparent and is displayed over further information displayed on the display.

20. A non-transient computer readable memory storing executable instructions that when executed by a processor cause the processor to generate a user timeline for a user associated with an electronic device by:

collecting, during operation of the electronic device, data that includes: location data for the electronic device; application use data received from a plurality of applications used by the ED; and activity data from one or both of input devices and sensing devices of the electronic device;

detecting occurrences of predetermined types of observed events based on the collected data, and for each detected occurrence storing a respective observed event record that includes information about a time and type of the observed event;

storing planned event records for planned events that the user is scheduled to participate in, the planned event records each including information about a time and type of a respective planned event;

predicting occurrences of predicted events including an occurrence of a first predicted event and corresponding nested predicted events, based on the observed event records and the planned event records, wherein the nested predicted events comprise a sequence of predicted events corresponding to a respective observed event record or a respective planned event record, that are predicted to occur during a duration of the first predicted event;

storing predicted event records for the first predicted event and the corresponding nested predicted events, the predicted event records each including information about a time and a type of the of a respective predicted event;

generating a timeline user interface (GUI) on the display screen based on the observed event records, the planned event records and the predicted event records; and outputting information about the observed events, the planned events and the predicted events on the timeline user interface based on the observed event records, the planned event records and the predicted event records, respectively.

* * * * *

UNITED STATES PATENT AND TRADEMARK OFFICE

CERTIFICATE OF CORRECTION

PATENT NO. : 12,164,756 B2
APPLICATION NO. : 17/231920
DATED : December 10, 2024
INVENTOR(S) : Wei Li et al.

It is certified that error appears in the above-identified patent and that said Letters Patent is hereby corrected as shown below:

On the Title Page

In the abstract:
"Generating a user timeline for an electronic device (ED) userData is collected" should read -- Generating a user timeline for an electronic device (ED). Data is collected --

In the Claims

Column 28, Line 53, Claim 20:
"generating a timeline user interface (GUI) on the display" should read -- generating a timeline user interface on the display --

Signed and Sealed this
Fourth Day of March, 2025

Coke Morgan Stewart
*Acting Director of the United States Patent and Trademark Office*